United States Patent
Wada et al.

(10) Patent No.: US 6,464,375 B2
(45) Date of Patent: *Oct. 15, 2002

(54) LENS ELEMENT AND ILLUMINATION OPTICAL APPARATUS AND PROJECTION DISPLAY APPARATUS

(75) Inventors: Mitsuhiro Wada, Katano (JP); Takaaki Tanaka, Hirakata (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/265,412

(22) Filed: Mar. 10, 1999

(65) Prior Publication Data

US 2002/0048172 A1 Apr. 25, 2002

(30) Foreign Application Priority Data

Mar. 12, 1998 (JP) ............................................. 10-060882
Jun. 15, 1998 (JP) ............................................. 10-167430

(51) Int. Cl.$^7$ ................................................ F21V 9/00
(52) U.S. Cl. ........................ 362/268; 362/242; 362/331
(58) Field of Search ................................. 362/268, 309, 362/331, 242, 243

(56) References Cited

U.S. PATENT DOCUMENTS

| | | | | |
|---|---|---|---|---|
| 5,418,583 A | * | 5/1995 | Masumoto | .................... 353/38 |
| 5,649,753 A | * | 7/1997 | Masumoto | .................. 353/102 |
| 5,765,934 A | | 6/1998 | Okamori et al. | |

FOREIGN PATENT DOCUMENTS

| | | |
|---|---|---|
| JP | 6-242397 | 9/1994 |
| JP | 9-50082 | 2/1997 |

* cited by examiner

Primary Examiner—Sandra O'Shea
Assistant Examiner—John Anthony Ward
(74) Attorney, Agent, or Firm—Smith, Gambrell & Russell, LLP.

(57) ABSTRACT

To provide an illumination optical apparatus comprising a plurality of illuminants, first condensing means for condensing the lights emitted from the illuminants, light synthesizing means for synthesizing the lights condensed by the first condensing means and emitting the synthesizing light in a predetermined direction, second condensing means into which the light emitted from the light synthesizing means comes to emit substantially parallel light, a first lens array constituted with a plurality of lenses to divide the light supplied from the second condensing means into a plurality of luminous fluxes, and a second lens array constituted with a plurality of lenses and into which the light supplied from the first lens array comes.

13 Claims, 29 Drawing Sheets

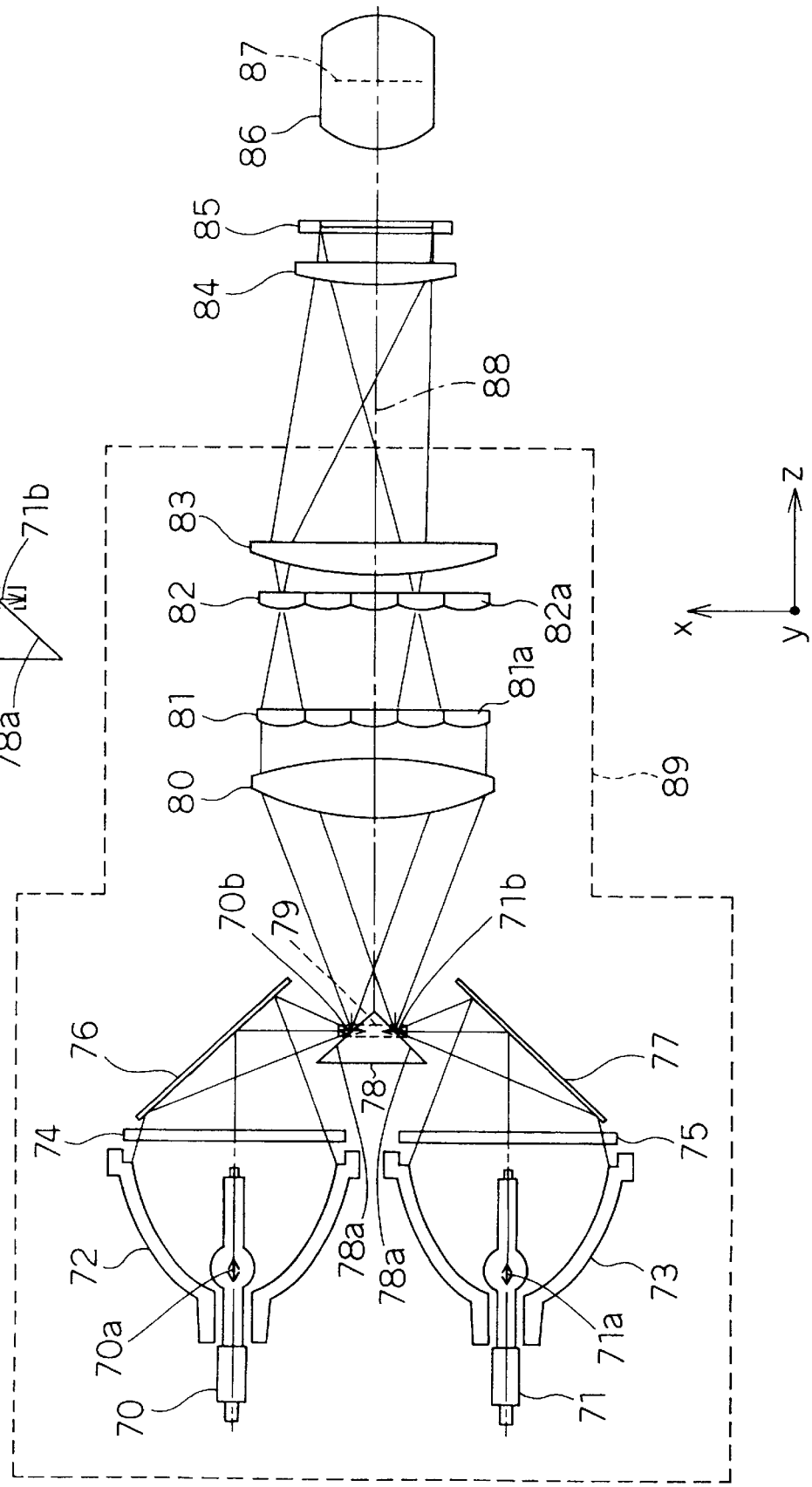

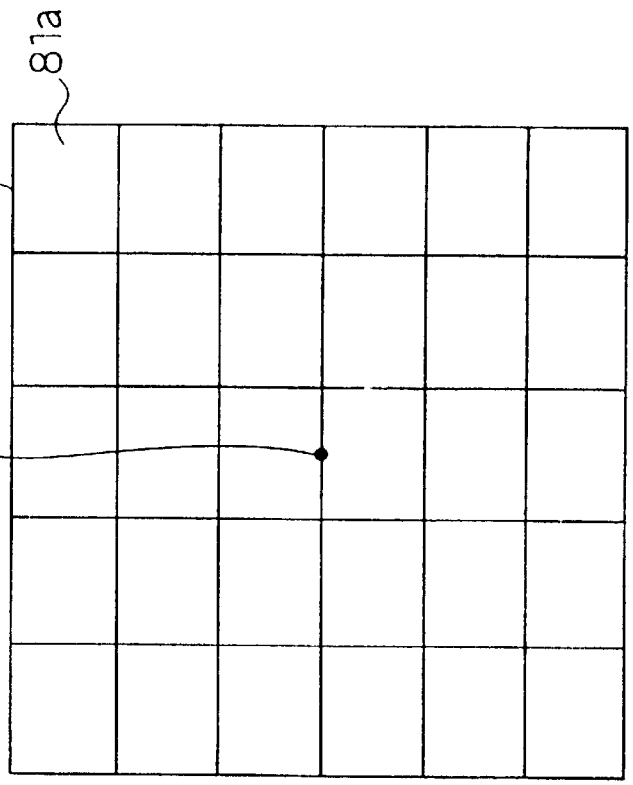
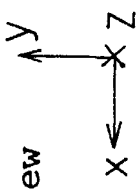

LENS ELEMENT AND ILLUMINATION OPTICAL APPARATUS AND PROJECTION DISPLAY APPARATUS

BACKGROUND OF THE INVENTION

1. Field of the Invention

The present invention relates to a lens element mainly used for illumination, an illumination optical apparatus for mainly illuminating a spatial optical modulator, and a projection display apparatus for projecting a large-screen image on a screen by using the illumination optical apparatus, a spatial optical modulator for forming an optical image when a video signal is supplied from an external unit, and a projection lens.

2. Description of the Related Art

Various types of projection display apparatuses respectively using the spatial optical modulator have been known so far as video units for a large screen. Each of these projection display apparatuses enlarges an optical image corresponding to a video signal supplied from an external unit with a projection lens and projects the image on a screen by using a transmission- or reflection-type liquid-crystal panel as a spatial optical modulator, illuminating the liquid-crystal panel with a light source, and forming the optical image on the liquid-crystal panel.

It is necessary for an illumination optical apparatus used for a projection display apparatus to have high uniformities of brightness and color, a high light-utilization efficiency, and a large light output on a light-receiving surface (spatial optical modulator).

A projection display apparatus using two lens arrays is disclosed as means for improving the uniformities of brightness and color (e.g. Japanese Patent Application Laid-Open Nos. Hei 3-111806 and Hei 5-346557). FIG. 26 shows a basic configuration of the projection display apparatus. The white light emitted from a lamp 280 is condensed by a concave reflector 281 to become a luminous flux advancing along and in parallel with an optical axis 288, pass through lens arrays 283, 284 and a field lens 285, and illuminate the display region of a liquid-crystal panel 286. A UV-IR cut filter 282 is used to remove unnecessary and harmful infrared light and ultraviolet light from illumination light. An optical image is formed on the liquid-crystal panel 286, which is enlarged by a projection lens 287 and projected on a screen (not illustrated).

It is generally known that the brightness of a luminous flux condensed by a concave reflector increases at a position closer to its optical axis because the luminous flux density rises and decreases at a portion farther from an optical axis because the density lowers. The lens arrays 283 and 284 are used to improve the brightness irregularity of a luminous flux condensed by a concave reflector. The first lens array 283 and the second lens array 284 are respectively constituted by two-dimensionally arranging a plurality of first lenses 283a and a plurality of second lenses 284a. A luminous flux emitted from the concave reflector 282 is divided into a plurality of micro luminous fluxes and these micro luminous fluxes are led in the superimposing configuration each other so that each micro luminous flux illuminates the entire display region of the liquid-crystal panel 286.

The conventional illumination optical apparatus shown FIG. 26 constituted by combining a concave reflector with two lens arrays completely meets the display uniformity requested for a projection display apparatus but it has the problems described below.

When constituting an illumination optical apparatus with lens arrays, the image of the illuminant of the lamp 280 is formed on the apertures of a plurality of second lenses 284a. This state is schematically shown in FIG. 27. When applying a luminous flux having a large brightness irregularity condensed by the concave reflector 282 to the first lens array 283, plural illuminant images 290 at a position closer to the optical axis where the luminous flux density is higher increase in size and the plural illuminant images 290 at a position farther from the optical axis where the luminous flux density is lower decrease in size. when the aperture of the second lens 284a is smaller than the illuminant images 290 formed there, the light leaking from the aperture results in a loss. When applying a large-enough aperture to the illuminant images 290, the illuminant images 290 decrease in size toward the circumference as shown in FIG. 27. Therefore, the number of unnecessary regions increases, the effective aperture 291 of the second lens array 284 increases, and a projection lens having a large converging angle is required. Increase of a converging angle causes the size of a projection lens to increase and results in increase of the cost. To decrease the irradiation angle of the light used for illumination, it is possible to increase an illumination optical path. However, the interval between the second lens array 284 and the liquid-crystal panel 286 increases and the entire size of a projector increases.

When an illuminant formed by the lamp 280 is small enough, the degree of a problem is low. However, an illuminant formed by a metal halide lamp or xenon lamp actually used for the above purpose has a problem because the illuminant has a size of a certain degree.

A projection display apparatus using a plurality of lamps is disclosed as means for increasing the light output of an illumination luminous flux (e.g. Japanese Patent Application Laid-Open Nos. Hei 6-242397 and Hei 6-265887 and Hei 9-50082). FIG. 28 shows a configuration of the above projection display apparatus.

Parabolic mirrors 303 and 304, UV-IR cut filters 305 and 306, first lens arrays 307 and 308, and second lens arrays 309 and 310 are arranged for a plurality of lamps 301 and 302 respectively. The light emitted from the second lens arrays 309 and 310 is divided into three primary color lights of red, green, and blue by dichroic mirrors 311 and 312 and thereafter, passes through field lenses 318, 319, and 320 and enters their respectively-corresponding liquid-crystal panels 321, 322, and 323. Relay lenses 313 and 314 correct the intensity difference of illumination light due to the difference between the illumination optical path lengths which are the distances between the second lens arrays 309 and 310 on one hand and the liquid-crystal panels 321, 322, and 323 on the other. Moreover, plane mirrors 315, 316, and 317 are arranged to bend the optical path of each color. Primary color lights of red, green, and blue emitted from the liquid-crystal panels 321, 322, and 323 are synthesized by dichroic prism 324 and then, enter a projection lens 325. The projection lens 325 enlarges optical images formed on the liquid-crystal panels 321, 322, and 323 and projects them on a screen (not illustrated).

Vicinities of surfaces of the second lens arrays 309 and 310 are almost conjugate with the pupil surface 326 of the projection lens 325 and the sizes and distribution of a plurality of illuminant images formed on the second lens arrays 309 and 310 are focused on the pupil surface of the projection lens 325. FIG. 29 schematically shows the state of illuminant images 340 and 341 formed on the pupil surface 326 of the projection lens 325. In FIG. 29, broken lines are virtual lines showing outlines of the second lens arrays 309 and 310. The illuminant images 340 and 341 corresponding to lamps 301 and 302 are formed on the pupil surface 326 of the projection lens 325 at both the sides of the optical axis 331 of the projection lens 325.

Vignetting is generally provided in the projection lens 325, in which the circumferential illuminance becomes lower than the central illuminance on a screen. This is because the illuminant images 340 and 341 on the pupil surface 326 of the projection lens 325 cause an eclipse due to vignetting. Therefore, when the luminous characteristics of two lamps 301 and 302 arranged at both the sides of the optical axis 331 are different from each other as shown in FIG. 29, illuminant images contributing to the brightness of the circumference of a screen are different from each other. Therefore, color irregularity occurs in a projected image on a screen. Moreover, if any lamp goes out, the illuminance distribution on the screen becomes irregular.

Furthermore, in the case of the configuration shown in FIG. 28, illumination light is led to the liquid-crystal panel 323 for one of primary color lights by arranging the relay lenses 313 and 314 in an optical path and therefore, an illuminant image formed on the pupil surface 326 of the projection lens 325 is reversed to the optical axis 331. Therefore, if the luminous characteristics of two lamps 301 and 302 are slightly different from each other, the condition of the eclipse of the illuminant image differs in only one color due to the vignetting of the projection lens 325 and resultantly, a large color irregularity occurs in a projected image on a screen.

Furthermore, because increase of the number of lamps causes a converging angle necessary for a projection lens to increase, it results in increase of the cost of the projection lens and increase of a projector in size.

As described above, in the case of a conventional illumination optical apparatus used for a projection display apparatus, it is a problem to obtain a luminous flux having a uniform brightness at a high efficiency without increasing the converging angle of a projection lens. Moreover, it is a problem to obtain an illumination luminous flux having a uniform brightness and a large light output at a high efficiency without being affected by an eclipse of a projection lens when a plurality of lamps are used.

SUMMARY OF THE INVENTION

It is an object of a lens element of the present invention to work on a luminous flux mainly condensed by a concave reflector and improve the illumination irregularity of the flux. Moreover, it is another object of an illumination optical apparatus of the present invention to form an illumination luminous flux having a uniform brightness, high efficiency, and large light output suitable to be mainly used for a projection display apparatus. Furthermore, by using the illumination optical apparatus of the present invention, it is possible to provide a projection display apparatus for realizing a bright projected image having less display irregularity.

The present invention of the first invention is a lens element working on an input luminous flux advancing along and substantially in parallel with an optical axis to emit an output luminous flux advancing along and substantially in parallel with the optical axis, comprising: an input-side lens group and an output-side lens group in order from an incoming side, wherein the input-side lens group has a negative power nearby an optical axis of an effective aperture and has a power of substantially zero at the circumference of the effective aperture of the input-side lens group, and the output-side lens group has a positive power nearby the optical axis of an effective aperture and has a power of substantially zero at the circumference of the effective aperture of the output-side lens group.

The present invention of the second invention is a lens element working on divergent light to form an output luminous flux advancing along and substantially in parallel with an optical axis, comprising; an input-side lens group and an output-side lens group in order from the incoming side, wherein the input-side lens group has a power of substantially zero nearby an optical axis of an effective aperture and has a positive power at the circumference of the effective aperture of the input-side lens group, and the output-side lens group has a positive power nearby an optical axis of an effective aperture and has a power of substantially zero at the circumference of the effective aperture of the output-side lens group.

In the case of a lens element of the present invention, the light-receiving-surface illuminance increases toward the optical axis because the input luminous flux density rises toward the optical axis but it decreases toward the circumference against the input luminous flux because the input luminous flux density lowers toward the circumference. Therefore, a high-luminous-flux-density region nearby the optical axis lowers in luminous flux density but a circumferential low-luminous-flux-density region remote from the optical axis improves in luminous flux density. Thus, it is possible to improve the uniformity of a luminous flux having a large brightness irregularity.

The present invention of the 3rd invention is an illumination optical apparatus for illuminating a predetermined region with a luminous flux advancing along and substantially in parallel with an optical axis, comprising: an illuminant; a concave reflector for forming a luminous flux advancing along and substantially in parallel with an optical axis by condensing the light emitted from the illuminant; an input-side lens group into which a luminous flux emitted from the concave reflector comes; and an output-side lens group into which a luminous flux emitted from the input-side lens group comes, wherein the input-side lens group has a negative power nearby an optical axis of an effective aperture and has a power of substantially zero at the circumference of the effective aperture of the input-side lens group, and the output-side lens group has a positive power nearby an optical axis of an effective aperture and has a power of substantially zero at the circumference of the effective aperture of the output-side lens group.

The present invention of the 4th invention is an illumination optical apparatus for illuminating a predetermined region with a luminous flux advancing along and substantially in parallel with an optical axis, comprising: an illuminant; a concave reflector for forming a secondary illuminant by condensing the light emitted from the illuminant; an input-side lens group into which the divergent light emitted from the secondary illuminant comes; and an output-side lens group into which a luminous flux emitted from the input-side lens group comes, wherein the input-side lens group has a power of substantially zero nearby an optical axis of an effective aperture and has a positive power at the circumference of the effective aperture of the input-side lens group, and the output-side lens group has a positive power nearby an optical axis of an effective aperture and has a power of substantially zero at the circumference of the effective aperture of the output-side lens group.

The present invention of the 5th invention is an illumination optical apparatus for illuminating a predetermined region by condensing the lights emitted from a plurality of illuminants, comprising: the illuminants; first condensing means for condensing the lights emitted from the illuminants; light synthesizing means for synthesizing the lights condensed by the first condensing means and emitting the synthesized light in a predetermined direction; second condensing means into which the light emitted from the light synthesizing means comes to emit substantially parallel light; a first lens array constituted with a plurality of lenses to divide the light supplied from the second condensing means into a plurality of luminous fluxes; and a second lens array constituted with a plurality of lenses and into which the light supplied from the first lens array comes, wherein images corresponding to the illuminants are formed on the lenses constituting the second lens array.

The 6th invention of the present invention is an illumination optical apparatus for illuminating a predetermined region by condensing the lights emitted from a plurality of illuminants, comprising: the illuminants; first condensing means for condensing the lights emitted from the illuminants; light synthesizing means for synthesizing the lights condensed by the first condensing means and emitting the synthesized light in a predetermined direction; second condensing means into which the light emitted from the light synthesizing means comes to control the luminous flux densities of incoming light so as to become substantially uniform from the vicinity of an optical axis of an effective aperture toward the circumference and emit substantially parallel light; a first lens array constituted with a plurality of lenses to divide the light supplied from the second condensing means into a plurality of luminous fluxes; a second lens array constituted with a plurality of lenses and into which the light supplied from the first lens array comes, wherein the second condensing means is provided with (1) an input-side lens having a power of substantially zero nearby an optical axis of an effective aperture and having a positive power at the circumference of the effective aperture, and (2) an output-side lens having a positive power nearby an optical axis of an effective aperture and having a power of substantially zero at the circumference of the effective aperture, and images corresponding to the illuminants are formed on the lenses constituting the second lens array.

The present invention of the 7th invention is an illumination optical apparatus for illuminating a predetermined region by condensing the lights emitted from a plurality of illuminants, comprising: the illuminants; first condensing means for condensing the lights emitted from a plurality of illuminants; light synthesizing means for synthesizing the lights condensed by the first condensing means and emitting the synthesized light in a predetermined direction; second condensing means into which the light emitted from the light synthesizing means comes to emit substantially parallel light; a first lens array constituted with a plurality of lenses to divide the lights supplied from the second condensing means into a plurality of luminous fluxes; a second lens array constituted with a plurality of lenses and into which the light supplied from the first lens array comes; polarized-light separation means into which the light supplied from the second lens array comes to separate natural light into two linearly polarized lights whose polarization directions are perpendicular to each other; and polarized-light rotation means into which the light supplied from the polarized-light separation means comes to rotate the polarization direction of at least one of the two linearly polarized lights, wherein images corresponding to the illuminants are formed on the lenses constituting the second lens array.

The present invention of the 8th invention is an illumination optical apparatus for illuminating a predetermined region by condensing the lights emitted from a plurality of illuminants, comprising: the illuminants; first condensing means for condensing the lights emitted from a plurality of illuminants; light synthesizing means for synthesizing the lights condensed by the first condensing means and emitting the synthesized light in a predetermined direction; second condensing means into which the light emitted from the light synthesizing means comes to control the luminous flux densities of incoming light so as to become substantially uniform from the vicinity of an optical axis of an effective aperture along the circumference and emit substantially parallel light; a first lens array constituted with a plurality of lenses to divide the light supplied from the second condensing means into a plurality of luminous fluxes; a second lens array constituted with a plurality of lenses and into which the light supplied from the first lens array comes; polarized-light separation means into which the light supplied from the second lens array comes to separate natural light into two linearly polarized lights whose polarization directions are perpendicular to each other; and polarized-light rotation means into which the light supplied from the polarized-light separation means comes rotating the polarization direction of at least one of the two linearly polarized lights, wherein the second condensing means is provided with (1) an input-side lens having a power of substantially zero nearby an optical axis of an effective aperture and having a positive power at the circumference of the effective aperture, and (2) an output-side lens having a positive power nearby an optical axis of an effective aperture and having a power of substantially zero at the circumference of the effective aperture, and images corresponding to the illuminants are formed on the lenses constituting the second lens array.

In the case of the illumination optical apparatuses of the above 5th to 8th present invention, it is preferable to set a plane mirror for bending an optical path between the first condensing means and the light synthesizing means.

It is more preferable for the plane mirror to use a cold mirror for passing infrared light and reflecting visible light.

It is preferable for the light synthesizing means to use a reflection prism provided with a plurality of reflection planes.

It is preferable for the light synthesizing means to use a rectangular prism provided with a total-reflection plane.

It is preferable that a plurality of lenses constituting the second lens array is a rectangle having a major axis and a minor axis, a plurality of illuminants is arranged on the same plane substantially parallel with the major axis, and the images of the illuminants are arranged along the major-axis direction.

Moreover, in the case of the illumination optical apparatus of the 7th or 8th present invention, it is preferable for the polarized-light separation means to use a plurality of polarized-light separation prism arrays constituted by arranging a plurality of polarized-light separation prisms respectively provided with a polarized-light separation film in the direction perpendicular to a plane including a plurality of illuminants at a constant pitch.

Furthermore, in the case of the illumination optical apparatus of the 6th or 8th present invention, it is preferable to set a plane mirror for bending an optical path between the input-side lens and the output-side lens.

It is more preferable for the plane mirror to use a cold mirror for passing infrared light and reflecting visible light.

An illumination optical apparatus of the present invention makes it possible to form an illumination luminous flux having a high brightness uniformity by using a lens element and a concave reflector of the present invention without increasing the converging angle of a projection lens. Moreover, when using a plurality of lamps, it is possible to form the illuminant images of the lamps on the same lens array and form an illumination luminous flux having a uniform brightness and a large light output at a high efficiency. By arranging polarized-light separation means and polarized-light rotation means at the outgoing side of a lens array, it is possible to form an illumination luminous flux with well-arranged polarization directions.

The present invention of the 16th invention is a projection display apparatus comprising: an illumination optical apparatus for forming illumination light according to said 3rd or 4th invention; a spatial optical modulator into which the light supplied from the illumination optical apparatus comes to form an optical image in accordance with a video signal; and projection means for projecting an optical image on the spatial optical modulator onto a screen.

It is preferable that a projection display apparatus of the 16th present invention is provided with a first lens array plate constituted with a plurality of lenses to divide the light emitted from an illumination optical apparatus into a plurality of luminous fluxes and a second lens array plate constituted with a plurality of lenses to receive the light emitted from the first lens array plate, wherein the second lens array makes the luminous fluxes reach the surface of a spatial optical modulator by superimposing the luminous fluxes each other.

The present invention of the 18th invention is a projection display apparatus comprising: the illumination optical apparatus for forming illumination light according to any one of said 5th to 8th inventions; a spatial optical modulator into which the light supplied from the illumination optical apparatus comes to form an optical image in accordance with a video signal, and projection means for projecting an optical image on the spatial optical modulator onto a screen.

The present invention of the 19th invention is a projection display apparatus comprising: the illumination optical apparatus for forming white light as illumination light according to any one of said 5th to 8th present invention; color separation means for separating the white light supplied from the illumination optical apparatus into lights of red, green, and blue components; three spatial optical modulators into which each color light supplied from the color separation means comes to form an optical image in accordance with a video signal; color synthesizing means for synthesizing red, green, and blue lights emitted from the spatial optical modulator, and projection means for projecting an optical image on the spatial optical modulator onto a screen.

The present invention of the 20th invention is a projection display apparatus comprising: the illumination optical apparatus for forming white light as illumination light according to any one of said 5th to 8th inventions; color separation means for separating the white light supplied from the illumination optical apparatus into lights of red, green, and blue components; a polarized-light separation prism into which each color light supplied from the color separation means comes to separate incoming light into two lights having polarized-light directions perpendicular to each other; three spatial optical modulators into which the light supplied from the polarized-light separation prism comes to form an optical image in accordance with a video signal; color synthesizing means for synthesizing red, green, and blue lights incoming after the red, green, and blue lights emitted from the spatial optical modulators pass the polarized-light separation prism, and projection means for projecting an optical image on the spatial optical modulator onto a screen.

A projection display apparatus of the present invention makes it possible to realize a bright projected image having a high display uniformity with a relatively small projector because of illuminating a spatial optical modulator with an illumination luminous flux formed by an illumination optical apparatus of the present invention and projecting the modulator with a projection lens.

BRIEF DESCRIPTION OF THE DRAWINGS

FIG. 8(a) is a schematic block diagram showing still another embodiment of an illumination optical apparatus of the present invention;

FIG. 8(b) is an expanded view of the reflection prism 78;

FIG. 9A is front view of a schematic block diagram showing a configuration of a first lens array;

FIG. 9B is a plan view of the schematic block diagram of FIG. 9A;

FIG. 9C is a side view of the schematic block diagram of FIG. 9A;

DESCRIPTION OF THE PREFERRED EMBODIMENTS

The specific embodiments of the present invention will be described below by referring to the accompanying drawings.
(Embodiment 1)

Figure 1:
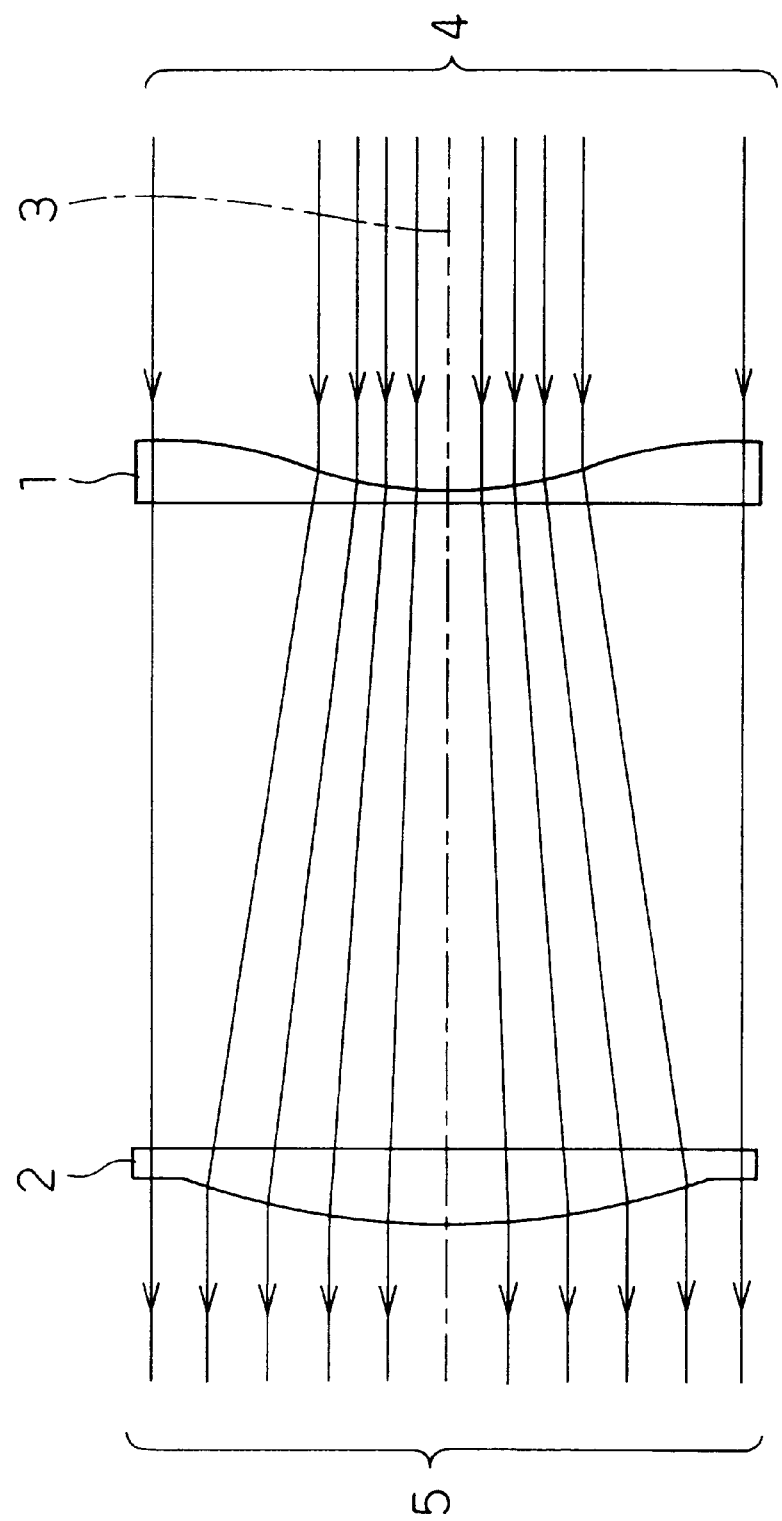
FIG. 1 is a schematic block diagram showing an embodiment of a lens element of the present invention.

FIG. 1 shows a basic configuration of a lens element of the present invention. The lens element is constituted with two lenses such as an input-side lens 1 and an output-side lens 2, which works on an input luminous flux 4 advancing almost in parallel with an optical axis 3 to emit an output luminous flux 5 advancing almost in parallel with the optical axis 3.

The input-side lens 1 is constituted with an aspherical incoming plane and a flat outgoing plane and has a lens shape rotation-symmetric to the optical axis 3. The input-side lens 1 has a negative power nearby the optical axis 3 to moderately radiate the light incoming to the vicinity of the optical axis 3. At the same time, the input-side lens 1 has a power of substantially zero at the aperture circumference working on the circumference of the effective cross section of the input luminous flux 4 and almost directly linearly advances the light passing the circumference.

The output-side lens 2 is constituted with a flat incoming plane and an aspherical outgoing plane and has a lens shape rotation-symmetric to the optical axis 3. The output-side lens 2 has a positive power nearby the optical axis 3 and emits the light entering the vicinity by refracting the light so as to become the light advancing almost parallel with the optical axis 3. At the same time, the output-side lens 2 has a power of substantially zero at the aperture circumference and directly emits the light passing the circumference of the input-side lens 1 without refracting the light.

According to the above configuration, a luminous flux passing the vicinity of the optical axis 3 is enlarged in the passing cross sectional area for the output luminous flux 5 compared to the passing cross sectional area for the input luminous flux 4. However, a luminous flux passing the circumference remote from the optical axis 3 is contracted in the passing cross sectional area for the output luminous flux 5 compared to the passing cross sectional area for the input luminous flux 4.

Therefore, when there is a luminous flux having a large brightness irregularity and the light-receiving-plane illuminance increases because the luminous flux density rises toward the optical axis 3 and lowers because the density lowers toward the circumference, if making the lens element shown in FIG. 1 work by using the above luminous flux as an input, a region having a high luminous flux density nearby the optical axis lowers the luminous flux density by increasing the passing area. A region having a low luminous flux density at the circumference remote from the optical axis improves the luminous flux density by decreasing the passing area. According to the above action, the brightness distribution of the cross section of the output luminous flux 5 is improved in uniformity compared to the brightness distribution of the cross section of the input luminous flux 4.

Figure 2:
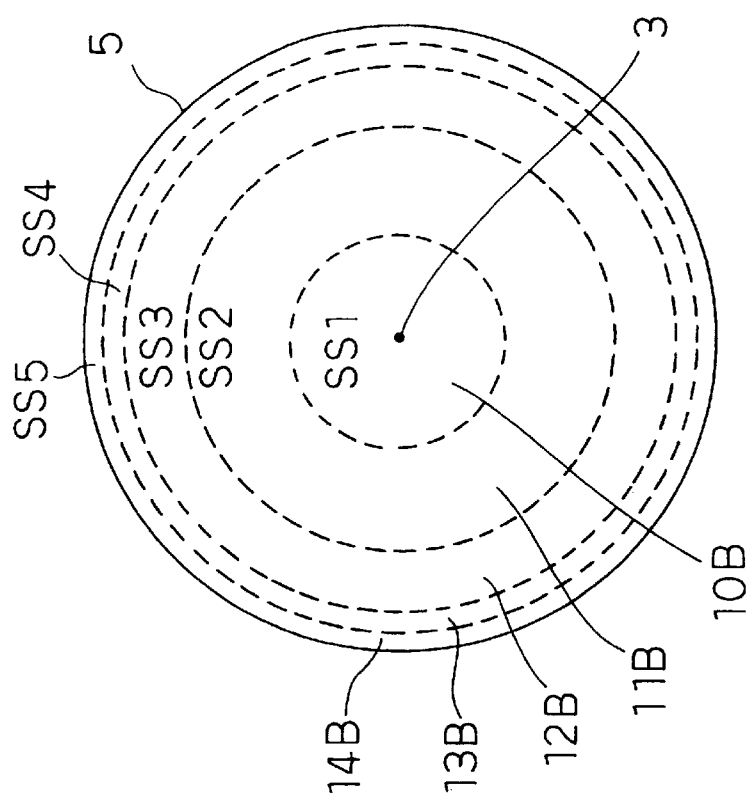
FIGS. 2(a) and 2(b) are schematic block diagrams for explaining functions of a lens element of the present invention.
Figure 2:
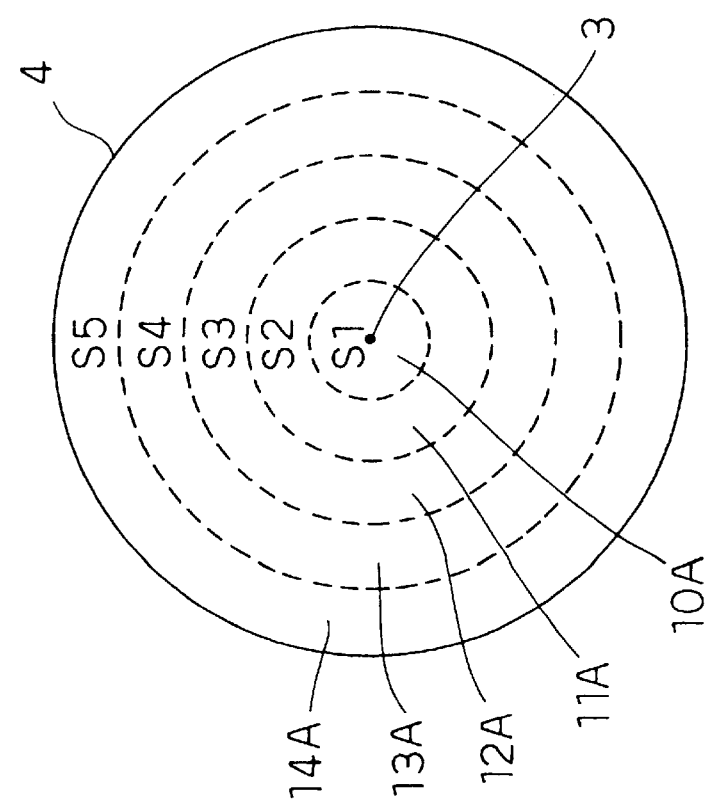

Functions to be provided for an embodiment of a lens element of the present invention are supplemented below by referring to FIGS. 2(a) and 2(b). The content described below is the outline of a basic concept to specifically design the surface shape of a lens element of the present invention. FIGS. 2(a) and 2(b) schematically show cross sections of luminous fluxes advancing along the optical axis 3, in which FIG. 2(a) shows the cross section of the input luminous flux 4 and FIG. 2(b) shows the cross section of the output luminous flux 5.

For example, the cross section of the input luminous flux is divided into five regions 10A, 11A, 12A, 13A, and 14A by the concentric circles shown by four broken lines. It is assumed that areas of the five regions are S1, S2, S3, S4, and S5. The cross section of the output luminous flux is also divided into five regions 10B, 11B, 12B, 13B, and 14B correspondingly to the above five regions and it is assumed that areas of the five regions are SS1, SS2, SS3, SS4, and SS5.

A lens element of the present invention is constituted so that the light passing the region 10A of the input luminous flux is emitted almost from the region 10B of the output luminous flux. The same is true for the regions 11A and 11B, 12A and 12B, 13A and 13B, and 14A and 14B. At the same time, the areas of the regions are formed so as to meet the expressions SS1>>S1, SS2>S2, SS3≈S3, SS4<S4, and SS5<<S5. Moreover, the effective luminous-flux diameters of the input luminous flux 4 and output luminous flux 5 are made almost equal and the input luminous flux 4 advancing in parallel with the optical axis 3 is emitted in parallel with the optical axis 3 in the output luminous flux 5.

According to the above configuration, a luminous flux passing the region 10A is lowered in the luminous flux density and emitted from the region 10B. The same is true for a luminous flux emitted from the region 11B. Luminous fluxes passing these regions are an input luminous flux and an output luminous flux whose brightness (illuminance) on a light-receiving plane is decreased. A luminous flux passing the region 12A and emitted from the region 12B is not changed in the brightness on the light-receiving plane because the luminous flux density is almost kept.

Luminous fluxes passing the region 13A and emitted from the region 13B are raised in luminous flux density, which are an input luminous flux and an output luminous flux and improved in the brightness on a light-receiving plane. The same is true for a luminous flux emitted from the region 14B. As the result of these actions, the brightness irregularity of an input luminous flux is corrected and thereby, it is possible to obtain an output luminous flux having an improved brightness uniformity.

The above procedure shows a concept for constituting a lens element of the present invention about a case of dividing the cross section of a luminous flux into five regions. However, the number of regions for dividing a cross section is only used for convenience' sake in order to simplify description. Even by actually constituting a lens element in accordance with the above procedure dividing a cross section into five regions, advantages of the present invention can be sufficiently obtained. Moreover, even by increasing the number of divisions and progressing an actual design, more sufficient result can be obtained for the advantage of a lens element of the present invention of improving the brightness uniformity.

Furthermore, FIG. 1 shows a configuration of a lens element of the present invention when using two lenses. However, advantages of the present invention are not restricted to the above case. It is preferable to constitute a lens element of the present invention with at least two groups such as an input-side lens group and an output-side lens group and constitute the input-side lens group so as to achieve the action described by using the input-side lens 1. At the same time, it is preferable to constitute the output-side lens group so as to achieve the action described by using the output-side lens 2.

Therefore, it is enough for the input-side lens group to have a negative power nearby an optical axis and have a power of substantially zero at the circumference. Moreover, it is enough for the output-side lens group to have a positive power nearby the optical axis and have a power of substantially zero at the circumference.

According to the above configuration, a lens element of the present invention works on an input luminous flux advancing along and almost in parallel with an optical axis and emits an output luminous flux advancing along and almost in parallel with the optical axis. Thus, it is possible to improve the uniformity of the brightness of the output luminous flux compared to that of the brightness of the input luminous flux.

(Embodiment 2)

Figure 3:
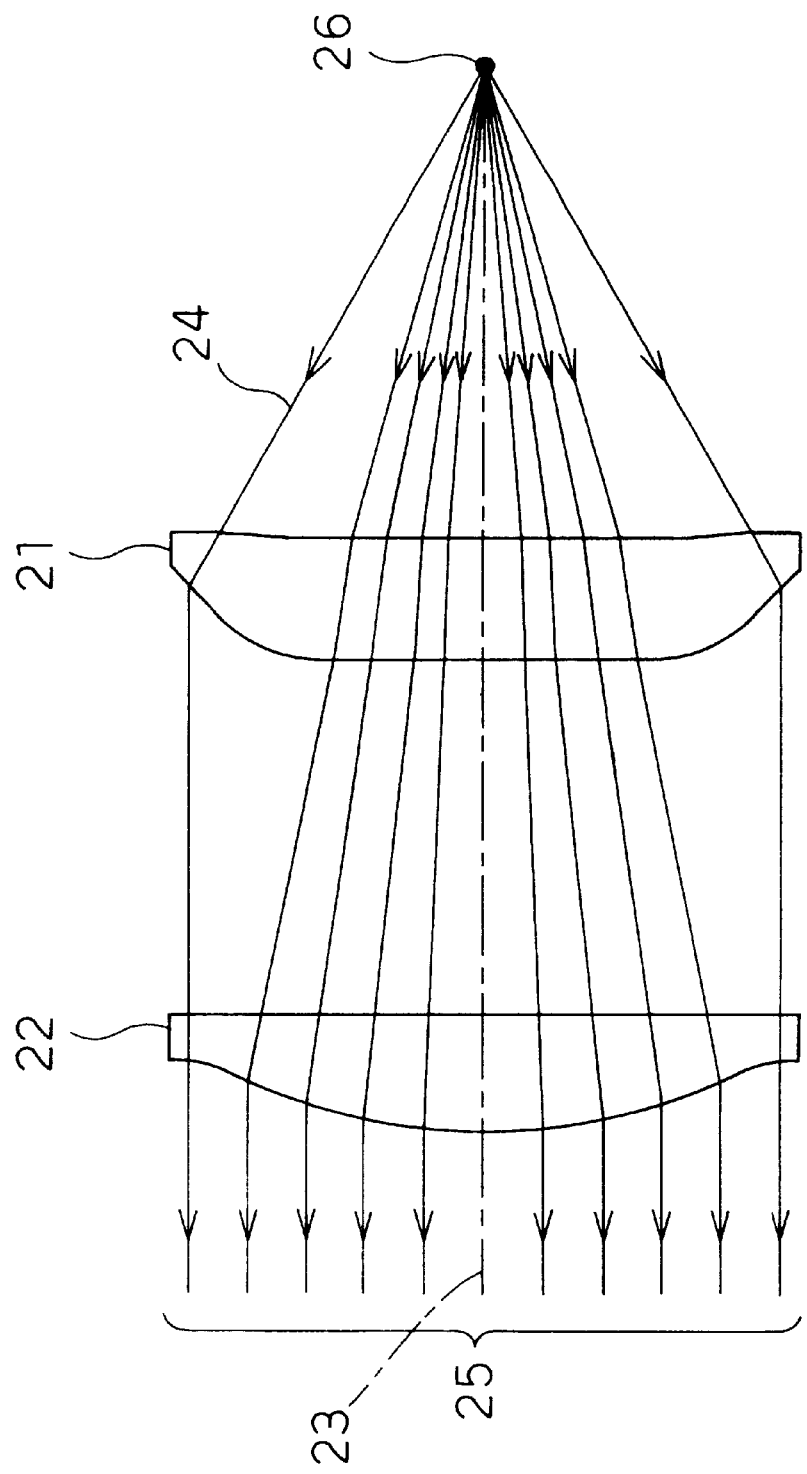
FIG. 3 is a schematic block diagram showing another embodiment of a lens element of the present invention.

FIG. 3 shows another basic configuration of a lens element of the present invention. The lens element is constituted with two lenses such as an input-side lens 21 and an output-side lens 22 and works on an input luminous flux 24 emitted from one point on an optical axis 23 to emit an output luminous flux 25 advancing almost in parallel with the optical axis 23.

The input-side lens 21 is constituted with aspherical incoming plane and outgoing plane, which has a lens shape rotation-symmetric to the optical axis. The input-side lens 21 has a power of substantially zero nearby the optical axis 23 and directly advances the light incoming to the vicinity of the optical axis 23 without greatly changing the advancing direction of the light. Moreover, the input-side lens 21 has a positive power for the light incoming to the aperture circumference of the input-side lens 21 remote from the optical axis 23, refracts the light, and emits the light as the light advancing almost in parallel with the optical axis 23.

The output-side lens 22 is constituted with a flat incoming plane and an aspherical outgoing plane, which has a lens shape rotation-symmetric to the optical axis 23. The output-side lens 22 has a positive power nearby the optical axis 23 and emits the light incoming to the portion as the light advancing almost in parallel with the optical axis 23. At the same time, the lens 22 has a power of substantially zero on the aperture circumference and directly emits the light advancing almost in parallel with the optical axis 23 from the circumference of the input-side lens 21.

A luminous flux passing the vicinity of the optical axis 23 is increased in the passing cross sectional area for the output-side lens 22 compared to the passing cross sectional area for the input-side lens 21. However, a luminous flux passing the circumference remote from the optical axis 23 is decreased in the passing cross sectional area for the output-side lens 22 compared to the passing cross sectional area for the input-side lens 21. Therefore, also in this case, it is possible to obtain an output luminous flux whose brightness irregularity is improved.

FIG. 3 shows a configuration of a lens element of the present invention when using two lenses. However, the advantages of the present invention are not restricted to the above case. It is preferable to constitute a lens element with at least two groups such as an input-side lens group and an output-side lens group so that each lens group achieves the above action.

Therefore, it is enough for the input-side lens group to have a power of substantially zero nearby an optical axis and a positive power at the circumference. Moreover, it is enough for the output-side lens group to have a positive power nearby the optical axis and a power of substantially zero at the circumference.

According to the above configuration, a lens element of the present invention works on the light emitted from almost one point and thereby, is able to form an output luminous flux having a high brightness uniformity advancing almost in parallel with the optical axis.

(Embodiment 3)

Figure 4:
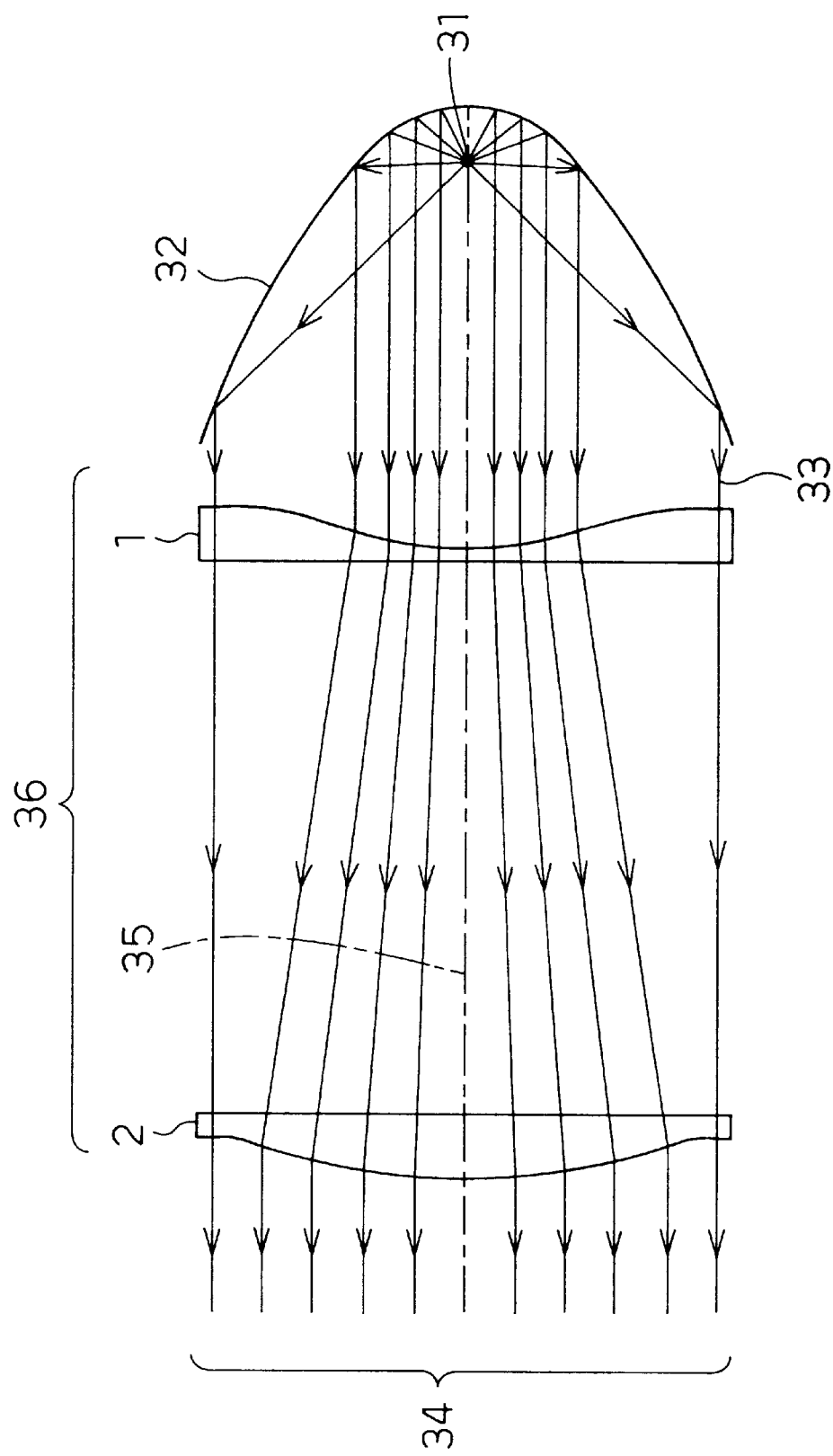
FIG. 4 is a schematic block diagram showing an embodiment of an illumination optical apparatus of the present invention.

FIG. 4 shows a basic configuration of an illumination optical apparatus of the present invention. The illumination optical apparatus is constituted with an illuminant 31, a parabolic mirror 32, an input-side lens 1, and an output-side lens 2. A lens element 36 constituted with the input-side lens 1 and the output-side lens 2 has the same configuration as the lens element of FIG. 1.

The illuminant 31 corresponds to, for example, an arc formed between electrodes of a discharge lamp or corresponds to the filament of a halogen lamp or the like. It is also possible to constitute the illuminant 31 with an electroluminescent body such as an LED. In the case of these illuminants, the center of gravity of their effective region is set nearby the focal point of a parabolic mirror. The parabolic mirror 32 condenses the light emitted from the illuminant 31 to form a luminous flux advancing along and almost in parallel with an optical axis 35.

The parabolic mirror 32 has an advantage that the condensing rate can be increased because the effective reflection plane of the mirror 32 has a large solid angle for the illuminant 31. Moreover, in the case of a condensed and emitted parallel luminous flux 33, the luminous flux density rises toward the optical axis 35 but lowers as going away from the optical axis 35. Therefore, the mirror 32 outputs an illumination luminous flux having a large brightness irregularity.

However, the lens element 36 constituted with the input-side lens 1 and the output-side lens 2 further uniforms the density of an incoming luminous flux 33 in accordance with the action and effect described by referring to FIG. 1 and outputs a luminous flux 34 with an improved brightness irregularity.

According to the above configuration, an illumination optical apparatus of the present invention makes it possible to obtain an illumination luminous flux with an improved brightness irregularity compared to the case of performing illumination by using only a conventional parabolic mirror.

(Embodiment 4)

Figure 5:
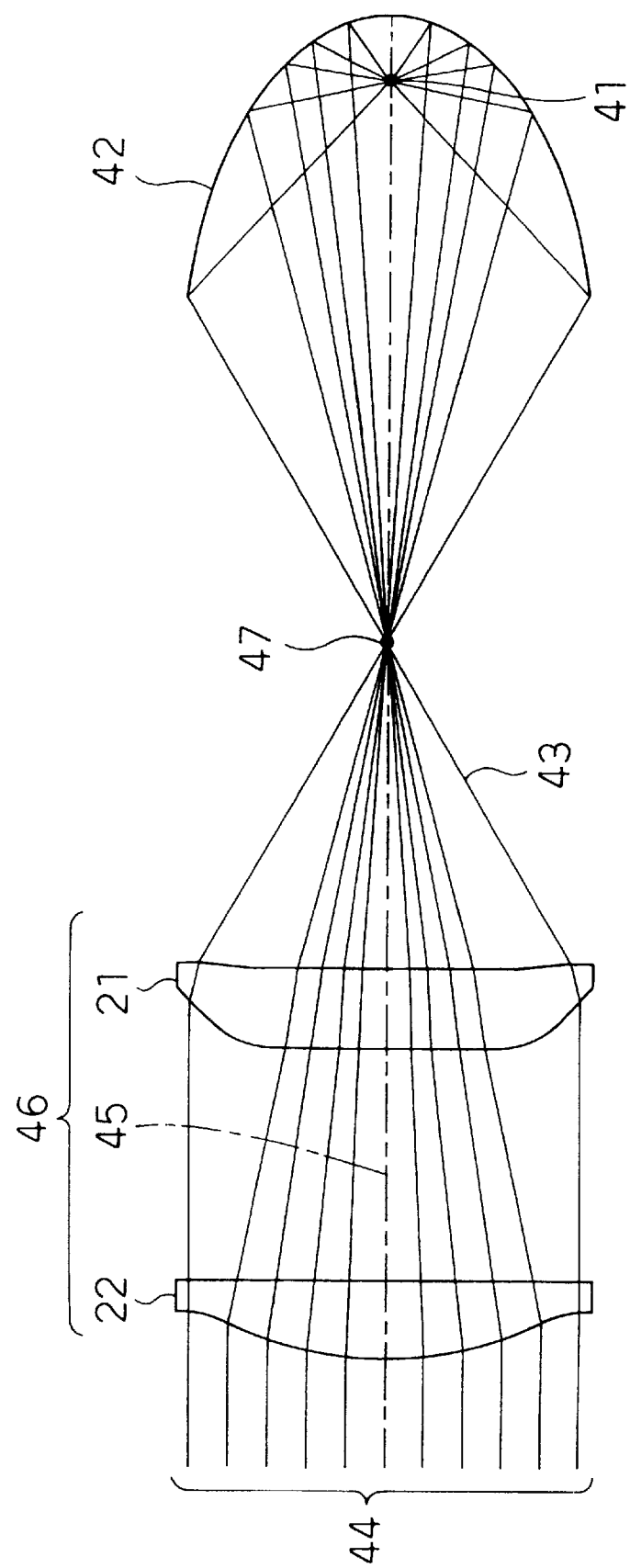
FIG. 5 is a schematic block diagram showing another embodiment of an illumination optical apparatus of the present invention.

FIG. 5 shows another basic configuration of an illumination optical apparatus of the present invention. The illumination optical apparatus is constituted with an illuminant 41, an ellipsoidal mirror 42, an input-side lens 21, and an output-side lens 22. A lens element 46 constituted with the input-side lens 21 and output-side lens 22 has the same configuration as the lens element of FIG. 3.

In the case of the illuminant 41, the center of gravity of the effective region is set nearby the first focal point of the ellipsoidal mirror 42. The ellipsoidal mirror 42 condenses the light emitted from the illuminant 41 and converges the light nearby the second focal point of the mirror 42. A spot-like luminous plane 47 is formed nearby the second focal point and the lens element 46 condenses the light emitted from the luminous plane 47 to form a luminous flux 44 advancing almost in parallel with the optical axis 45.

Functions and advantages of an illumination optical apparatus of the present invention are supplemented below by referring to FIG. 6.

Figure 6:
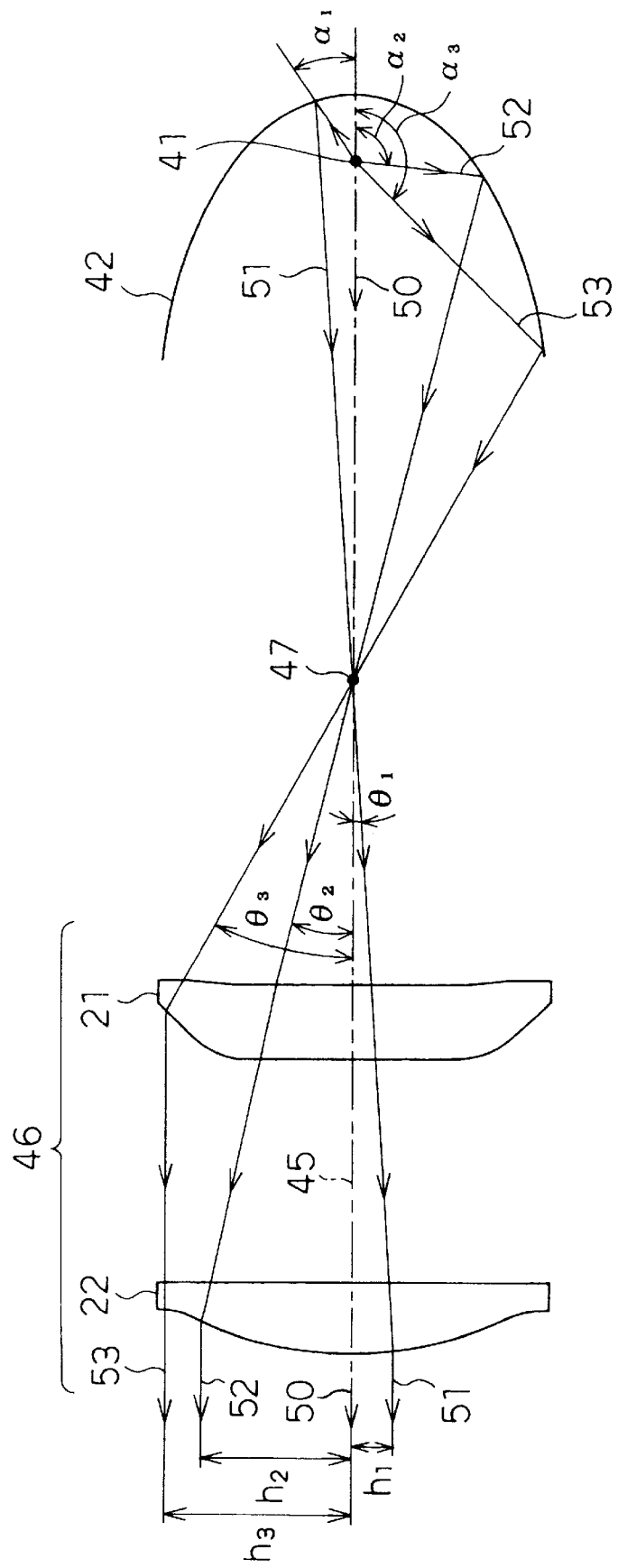
FIG. 6 is a schematic diagram for explaining functions of an illumination optical apparatus of the present invention.

FIG. 6 is a diagram of the illumination optical apparatus of FIG. 5 showing only the rays used for explanation. In the description below, the following four rays are assumed: a ray 50 passing on the optical axis 45, a ray 51 passing nearby the optical axis 45, a ray 53 passing the farthest circumference of the aperture of the ellipsoidal mirror 42 and the farthest circumference of the lens element 46, and a ray 52 passing the inside of the ray 53.

Among the above rays, two angles $\alpha$ and $\beta$ and one height h are defined for three rays 51, 52, and 53. It is assumed that the angle formed between the light emitted from the illuminant 41 and the optical axis 45 is $\alpha$ and angles $\alpha 1$, $\alpha 2$, and $\alpha 3$ are assigned to the rays 51, 52, and 53 on the ellipsoidal mirror 42. However, the absolute value of the angle $\alpha$ is noticed but its direction (code) does not have any meaning. In FIG. 6, the angle $\alpha 1$ and the angles $\alpha 2$ and $\alpha 3$ are shown at both the sides of the optical axis 45 for convenience' sake. However, because this system is rotation-symmetric to the optical axis 45, it is preferable to assume $\alpha 1$, $\alpha 2$, and $\alpha 3$ as positive angles.

Moreover, it is assumed that the angle formed between the light passing the second focal point and advancing toward the input-side lens 21 and the optical axis 45 is $\theta$. Moreover, it is assumed that angles $\theta 1$, $\theta 2$, and $\theta 3$ are assigned to the rays 51, 52, and 53. However, it is preferable to assume that the angle $\theta$ is a positive angle similarly to the case of the angle $\alpha$.

In the case of rays emitted from the output-side lens 22, the height from the optical axis 45 is defined as h because these rays advance in parallel with the optical axis 45. Moreover, heights h1, h2, and h3 are assigned to the rays 51, 52, and 53. Furthermore, it is assumed that the height h is a positive value by noticing only the absolute value of the height h because of the same reason as the above.

Figure 7:
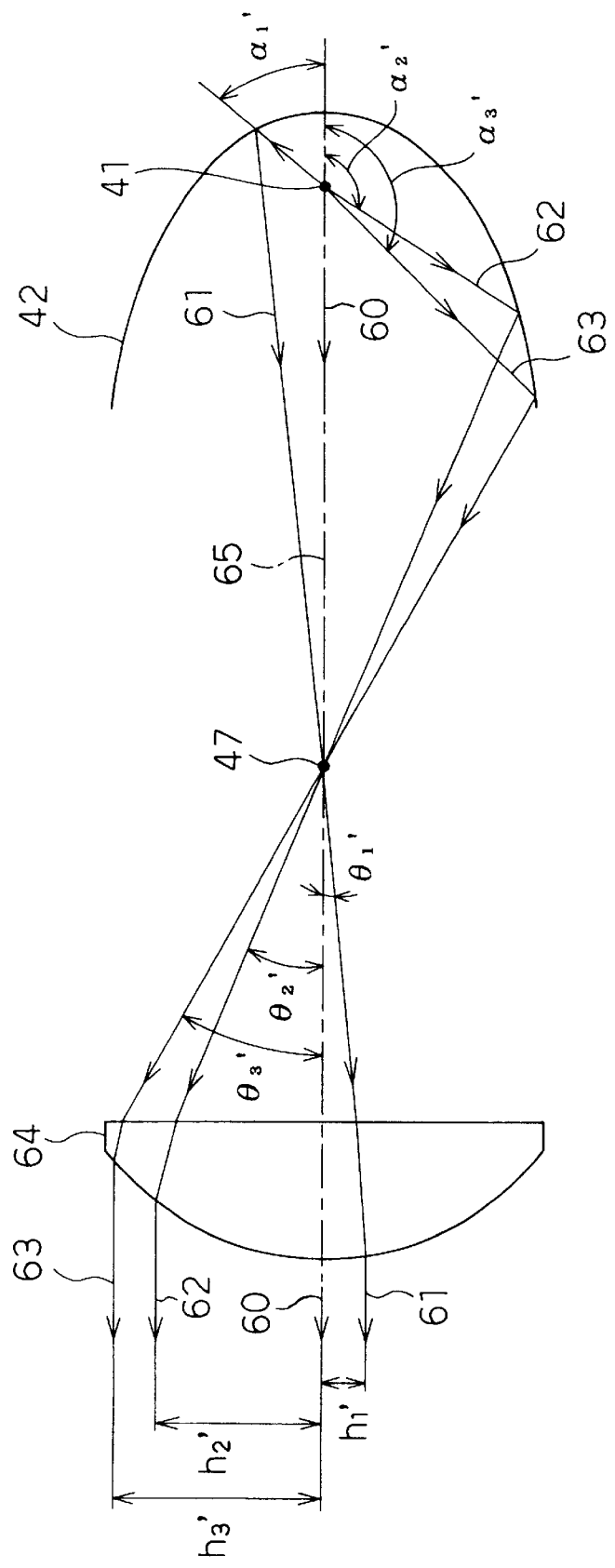
FIG. 7 is a schematic diagram for explaining functions of a prior illumination optical apparatus.

Furthermore, a conventional configuration is shown in FIG. 7 to more clearly describe functions and advantages of the present invention through comparison. FIG. 7 shows a luminous spot 47 formed nearby the second focal point by using an illuminant 41 and an ellipsoidal mirror 42 same as those of FIG. 6. Conventionally, the luminous spot 47 is condensed by a proper condenser lens 64 to form a luminous flux advancing along and almost in parallel with an optical axis 65. In the case of a condenser lens 64, it is generally widely known to eliminate a spherical aberration by adjusting the focal point of the lens 64 to the second focal point of the ellipsoidal mirror 42 and using an aspheric surface having a proper conical coefficient. By using the condenser lens 64, the light radiated from one point is emitted as the light advancing in parallel with the optical axis 65.

Also in FIG. 7, four rays are defined similarly to the case of FIG. 6. In this case, the following four rays are assumed: a ray 60 passing on the optical axis 65, a ray 61 passing nearby the optical axis 65, a ray 63 passing the farthest circumference of the aperture of the ellipsoidal mirror 42 and the farthest circumference of the condenser lens 64, and a ray 62 passing the inside of the ray 63.

Moreover, in the case of the rays 61, 62 and 63, angles $\alpha 1'$, $\alpha 2'$, and $\alpha 3'$, angles $\theta 1'$, $\theta 2'$, and $\theta 3'$, and height angles h1', h2', and h3' are shown in FIG. 7 and defined similarly to the case of FIG. 6.

In the configuration of an illumination optical apparatus of the present invention of FIG. 6 and the conventional configuration of FIG. 7, rays are defined so that the heights h1, h2, and h3 become equal to each other. For both the configurations, a brightness nearby the optical axis of an emitted luminous flux and a brightness at the circumference of a luminous flux are assumed. The area of a complete circle defined by the height h1 is assumed as S1 nearby an optical axis. The area of an orbicular zone between the heights h2 and h3 is assumed as S2 at the circumference of a luminous flux.

In FIG. 6, the light for illuminating the area S1 is a ray group passing a region between the rays 50 and 51, which is a ray group included in the angles $\alpha 1$ and $\theta 1$. In FIG. 7, the light for illuminating the area S1 is a ray group passing the region between the rays 60 and 61, which is a ray group included in the angles $\alpha 1'$ and $\theta 1'$. Moreover, in FIG. 6, the light for illuminating the area S2 is a ray group passing a region between the rays 52 and 53, which is included in the region from the angle $\alpha 2$ to the angle $\alpha 3$ and the region from the angle $\theta 2$ to the angle $\theta 3$. In FIG. 7, the light for illuminating the area S2 is a ray group passing the region between the rays 62 and 63, which is included in the region from the angle $\alpha 2'$ to the angle $\alpha 3'$ and the region from the angle $\theta 2'$ to the angle $\theta 3'$.

By referring to FIG. 7, problems of a conventional configuration are first described below. The above areas S1 and S2 have the relation of S1<<S2 on the cross section (light-receiving plane) of an outgoing luminous flux. This is clear when the height h1' is equal to the height h3'-h2'. Therefore, to illuminate these two regions S1 and S2 in the same brightness, it is necessary to lead more rays to the S2 side in accordance with the areas S1 and S2.

However, the light to be led to these areas S1 and S2 is determined by the angle a of the ellipsoidal mirror 42. For example, because the light to be supplied to the area S1 is applied to the range between the rays 60 and 61, the light becomes a ray group included in the angle $\alpha 1'$. Because the light to be supplied to the area S2 is applied to the range between the rays 62 and 63, the light becomes a ray group included in the angle $\alpha 3'-\alpha 2'$.

In the case of the conventional configuration shown in FIG. 7, it is clear that $\alpha 1'$ becomes larger than $\alpha 3'-\alpha 2'$ and therefore, more ray groups are condensed and led to the smaller areaSi nearbytheray 65. Therefore, the vicinity of the optical axis 65 becomes bright because the luminous flux density is high and the luminous flux circumference remote from the optical axis 65 becomes dark because the luminous flux density is low and the brightness irregularity increases at the circumference.

In the case of the illumination optical apparatus of the present invention shown in FIG. 6, the above problems are improved. Because the heights h1, h2, and h3 are common to FIGS. 6 and 7, the same is true for the areas S1 and S2 and thus, α1' is larger than α1, and α3'-2' is smaller than α3-α2. Therefore, by constituting the illumination optical apparatus shown in FIG. 5 with a lens element of the present invention, rays reaching the vicinity of the optical axis 45 decreases in the condensing range al on the ellipsoidal mirror 42 and lowers its brightness. However, rays reaching the circumference of a luminous flux increase in the condensing range α3-α2 on the ellipsoidal mirror 42 and improve their brightness. Thereby, it is possible to improve the brightness irregularity of an outgoing luminous flux.

When understanding the above functions through comparison between a lens element of the present invention and a conventional condenser lens, the lens element of the present invention is constituted so as to be θ1'>θ1 and θ3'-θ2'<θ3-θ2.

According to the above configuration, an illumination optical apparatus of the present invention works on a luminous flux condensed by an ellipsoidal mirror to form an illumination luminous flux having a high brightness uniformity.

(Embodiment 5)

FIGS. 8(a) and 8(b) show still another basic configuration of an illumination optical apparatus of the present invention. An illumination optical apparatus of the present invention forms an illumination luminous flux for mainly illuminating a spatial optical modulator by using a plurality of lamps. An illumination optical apparatus 89 is constituted with lamps 70 and 71, ellipsoidal mirrors 72 and 73 serving as first condensing means, UV-IR cut mirrors 74 and 75, plane mirrors 76 and 77, a reflection prism 78 serving as light synthesizing means (shown in FIG. 8(b)), a condenser lens 80 serving a second condensing means, a first lens array 81, a second lens array 82, and a beam synthesizing lens 83. A spatial optical modulator uses a transmission-type liquid-crystal panel for modulating light by using polarized light and scattering.

Moreover, to show the directional relation between FIGS. 9A to 11 and FIGS. 8(a) and 8(b), X, Y. and Z coordinate axes are shown in each drawing.

The lamps 70 and 71 respectively use a discharge lamp such as a metal halide lamp. An illuminant 70a is formed between electrodes of the lamp 70 and an illuminant 71a is formed between electrodes of the lamp 71. The center of gravity of the effective region of the illuminant 70a is set to the vicinity of the first focal point of the ellipsoidal mirror 72 and the center of gravity of the effective region of the illuminant 71a is set to the vicinity of the first focal point of the ellipsoidal mirror 73. Moreover, reflection planes 78a of the reflection prism 78 are set to the vicinities of the second focal points of the ellipsoidal mirrors 72 and 73. Lights emitted from the illuminants 70a and 70b are condensed by the ellipsoidal mirrors 72 and 73 to form illuminant images 70b and 71b nearby the second focal points of the ellipsoidal mirrors 72 and 73, that is, nearby the reflection planes 78a of the reflection prism 78. A reflection coating made of an aluminum film or dielectric multilayer film is applied to the reflection planes 78a of the reflection prism 78 and thereby, the planes 78a efficiently reflect visible light. It is preferable to set the tilt angle of the reflection plane 78a so that the optical axis of reflected light becomes almost parallel with the optical axis of the condenser lens 80. The UV-IR cut filters 74 and 75 are used to remove harmful ultraviolet and infrared lights from the lights emitted from the lamps 70 and 71. Moreover, the plane mirrors 76 and 77 are used to bend the optical paths of the lights emitted from the ellipsoidal mirrors 72 and 73.

According to the above configuration, it is possible to obtain a state equivalent to the state in which the illuminants 70a and 71a originally separated from each other are arranged very closely to each other and efficiently synthesize the lights emitted from the lamps 70 an 71. In this case, it is defined as synthesis to condense the lights emitted from a plurality of lamps up to a degree in which the lights can be almost regarded as one light emission source. Hereafter, the illuminant images 70a and 71a are referred to as a secondary light source 79.

The light emitted from the secondary light source 79 is scattered light which enters the condenser lens 80. The condenser lens 80 uses, for example, an aspheric lens and its focal point is almost adjusted to the center of gravity of the secondary light source 79. By using the condenser lens 80, the light emitted from the center of gravity of the secondary light source 79 is lowered in luminous flux density along the circumference of an effective aperture optical axis 88 from the vicinity of the axis 88, changed to the light advancing in parallel with the optical axis 88, and emitted.

A parallel luminous flux emitted from the condenser lens 80 enters the first lens array 81 constituted with a plurality of lenses 81a and is divided into a lot of micro luminous fluxes. FIGS. 9A-9C show a configuration of the first lens array 81. The lenses 81a are two-dimensionally arranged, the shape of each lens 81a is formed to be analogous to the display region of the liquid-crystal panel 85, and the focal length of each lens 81a is made almost equal to the interval between the first lens array 81 and the second lens array 82. In FIGS. 9A-9C, the lenses 81a have the same aperture shape. Hereafter, the lens element 81a for constituting the first lens array 81 is referred to as first lens.

Figure 10:
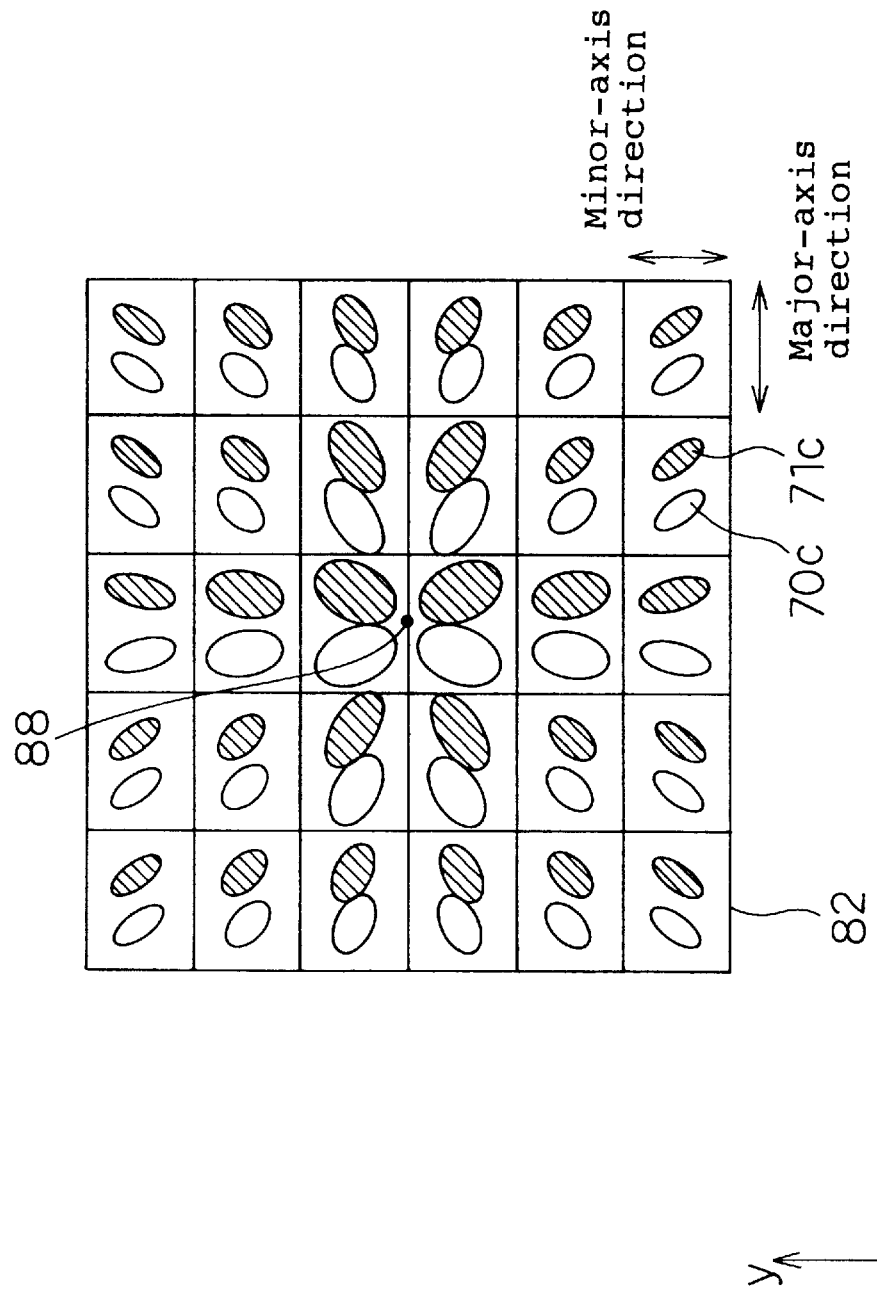
FIG. 10 is a schematic diagram showing one embodiment of an illuminant image on a second lens array of the present invention.

Many micro luminous fluxes are converged on the second lens array 82 constituted with a plurality of lenses 82a. Many images by the illuminants 70a and 71a are formed on the second lens array 82 as images of the secondary light source 79. It is preferable to form the second lens array 82 into the same shape as, for example, the first lens array 81. Hereafter, the lens element 82a for constituting the second lens array 82 is referred to as second lens. FIG. 10 schematically shows the state of illuminant images formed on the second lens array 82. Two illuminant images 70c and 71c are formed on each aperture of the second lens 82a as, the images of the secondary light source 79. By forming these two illuminant images 70c and 71c in the major axis direction of the aperture of the second lens 82a, it is possible to improve the light-utilization efficiency. Moreover, in FIG. 10, the illuminant image 71c is separated from the illuminant image 70c by hatching the illuminant image 71c corresponding to the illuminant 71 but not hatching the illuminant image 70c.

The second lens 82a enlarges a micro luminous flux incoming to the surface of the corresponding first lens 81a and illuminates the surface of the liquid-crystal panel 85. Therefore, the focal length of the second lens 82a is determined so that the surface of the first lens 81a becomes almost conjugate with the surface of the liquid-crystal panel 85. The beam synthesizing lens 83 is used to superimpose the lights emitted from a plurality of second lenses 82a each other on the liquid-crystal panel 85. Because an incoming luminous flux of the first lens array 81 is divided into a lot of micro luminous fluxes and then, they are enlarged and superimposed each other on the liquid-crystal panel 85, it is possible to uniformly illuminate the surface of the liquid-crystal panel 85. To constitute an illumination optical apparatus by using a lens array, illuminant images are discretely formed on a second lens array. In FIG. 8, however, because the images 70C and 71C of the plural illuminants 70 and 71 are densely formed on the aperture of the second lens 82*a*, it is unnecessary to greatly increase the effective aperture of the second lens array 82. Therefore, by constituting a projection display apparatus with the above illumination optical apparatus, it is possible to display a bright projected image by using a projection lens having a relatively small converging angle.

A field lens 84 is used to condense the light for illuminating the liquid-crystal panel 85 on the pupil surface 87 of a projection lens 86. The projection lens 86 projects an optical image formed on the liquid-crystal panel 85 onto a screen (not illustrated).

Figure 11:
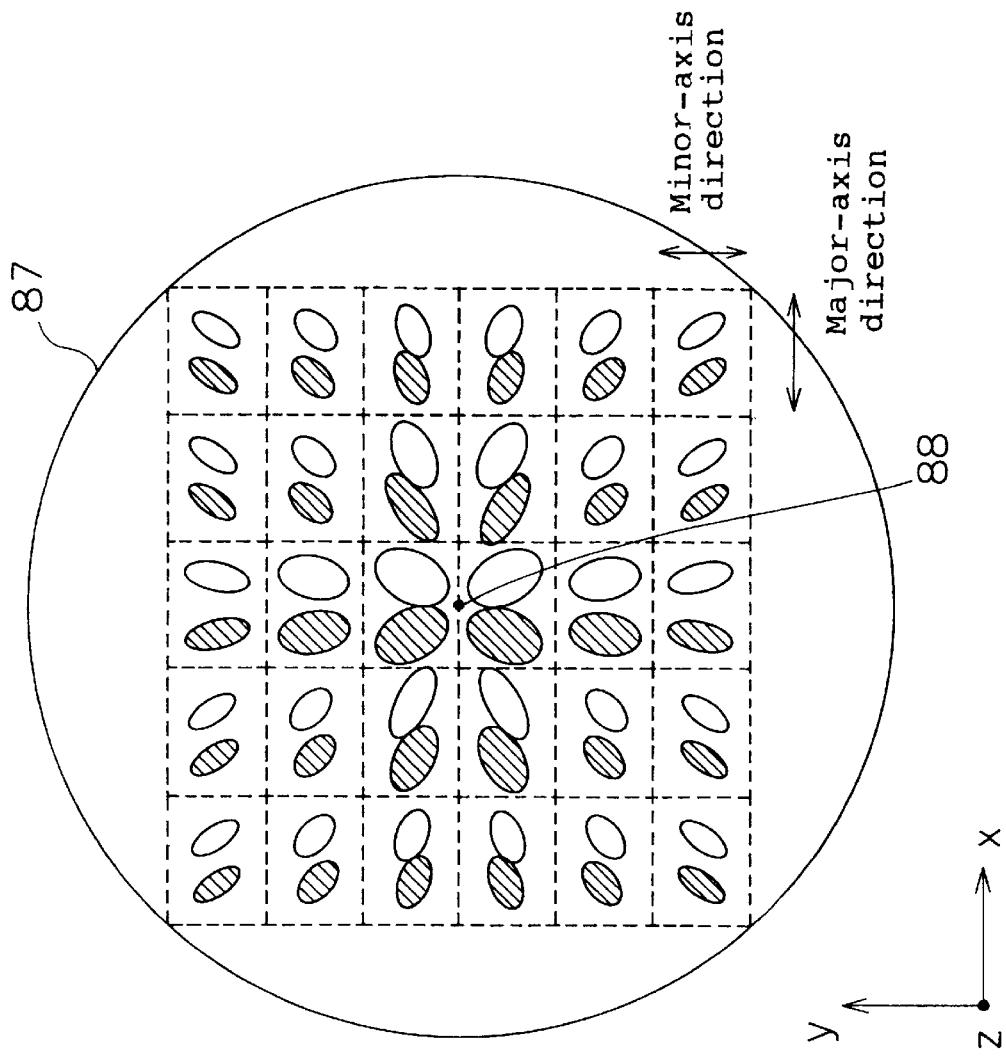
FIG. 11 is a schematic diagram showing one embodiment of an illuminant image on the pupil surface of a projection lens of the present invention.
Figure 28:
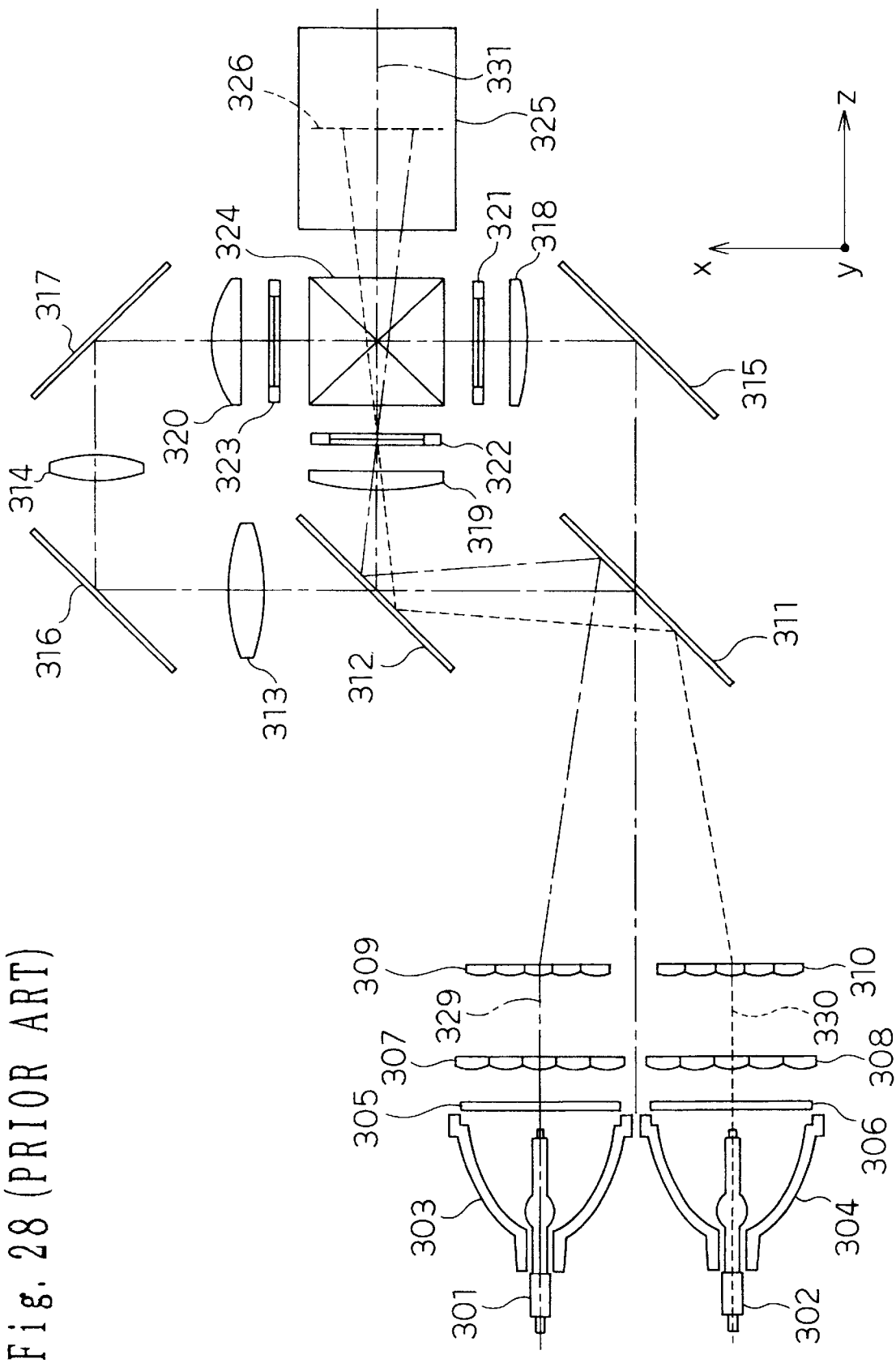
FIG. 28 is a schematic block diagram showing another embodiment of a conventional projection display apparatus.
Figure 29:
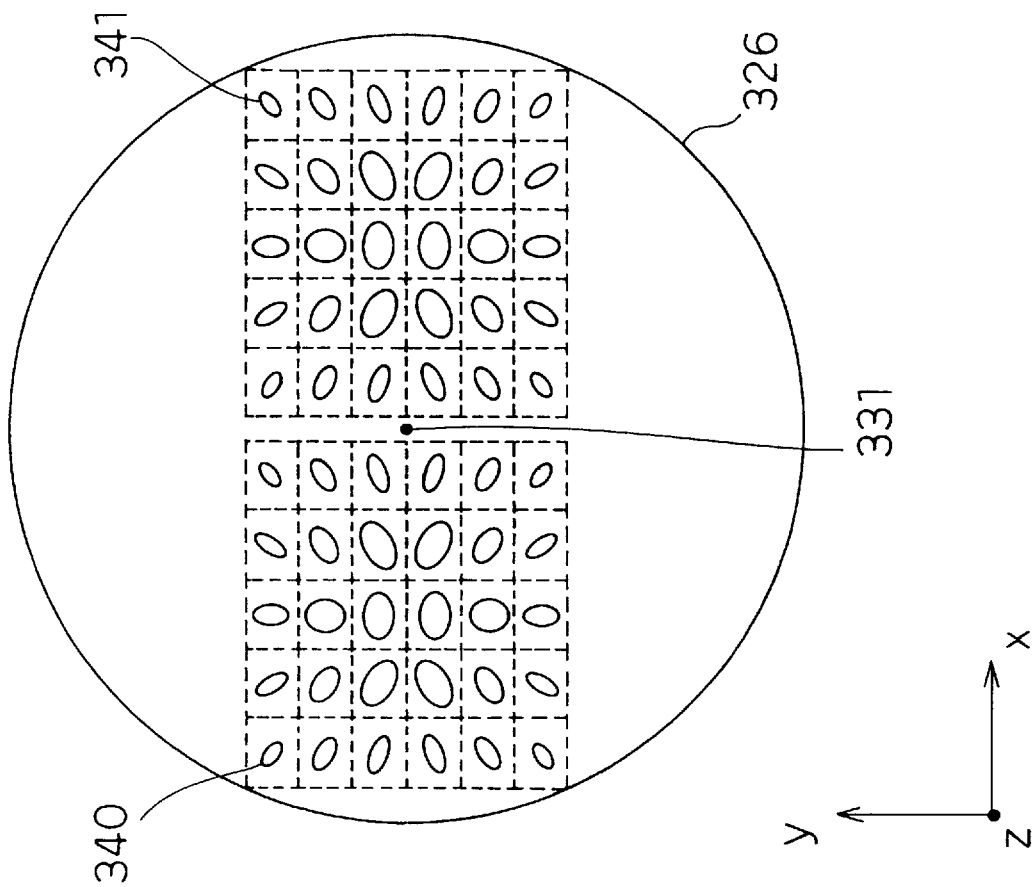
FIG. 29 is a schematic diagram showing an illuminant image on the pupil surface of a conventional projection lens.

The pupil surface 87 of the projection lens 86 is almost conjugate with the vicinity of the surface of the second lens array 82 and the illuminant images 70*c* and 71*c* formed on the second lens array 82 are imaged on the pupil surface 87 of the projection lens 86. FIG. 11 schematically shows the state of the pupil surface 87 of the projection lens 86. Broken lines are virtual lines showing the outline of the second lens array 82. By comparing with the conventional configuration shown in FIG. 28, it is found in FIG. 11 that two illuminant images are formed almost symmetrically to the optical axis 88. Therefore, an advantage can be obtained that brightness or color irregularity does not occur even if lamps have luminous characteristics different from each other or a lamp goes out.

The lamps 70 and 71 can respectively use not only a discharge lamp but also an electroluminescent body such as a halogen lamp or an LED. The ellipsoidal mirrors 72 and 73 can respectively use any mirror as long as a mirror for condenses the lights emitted from the lamps 70 and 71 into almost one point. For example, it is possible to use a positive-power condenser lens.

The plane mirrors 76 and 77 arranged between the ellipsoidal mirrors 72 and 73 on one hand and the reflection prism 78 on the other can respectively use a cold mirror. Because the cold mirror passes infrared light and reflects visible light, it is possible to control the heat produced by the reflection prism 78 and condenser lens 80. Moreover, it is possible to use a configuration for directly applying the light condensed by the ellipsoidal mirrors 72 and 73 to the reflection planes 78*a* of the reflection prism 78 instead of using the plane mirrors 76 and 77.

Figure 12:
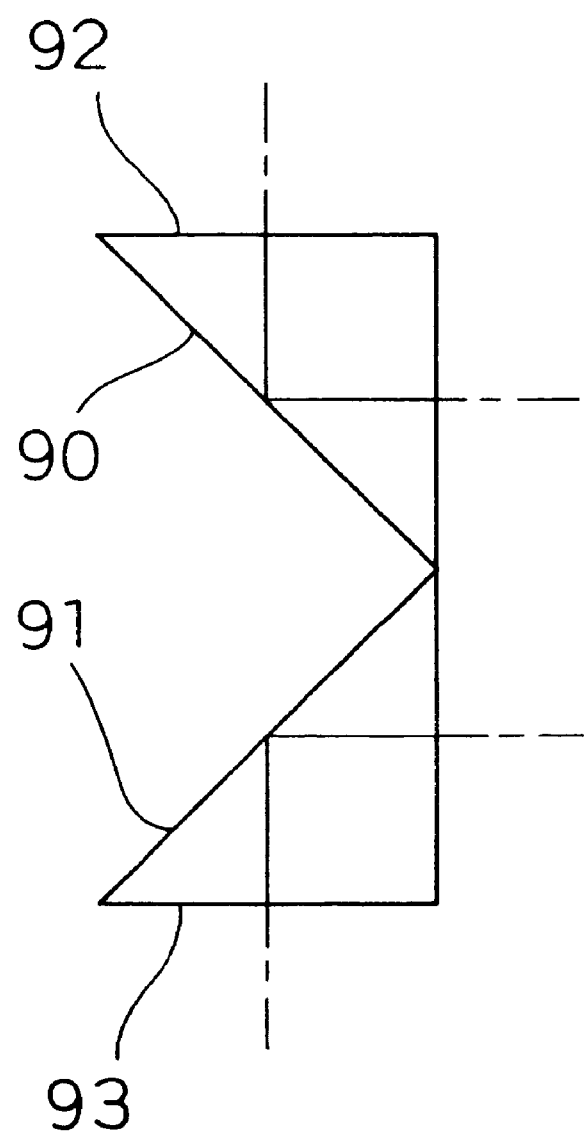
FIG. 12 is a schematic block diagram showing another configuration of a reflection prism.

It is possible to use the rectangular prisms 92 and 93 provided with total-reflection planes 90 and 91 shown in FIG. 12 instead of using the reflection prism 78. Because a reflectance can be improved by using total reflection, the efficiency is improved. In this case, by using quartz glass having a high heat resistance for a prism, it is possible to improve the reliability. Moreover, it is possible to use a plane mirror instead of the reflection prism 78.

It is possible to use any reflection prism as long as the prism almost synthesizes the lights incoming from different directions and emits them in a predetermined direction. For example, it is also possible to use a light-conductive optical component such as an optical fiber.

It is not restricted to constitute the condenser lens 80 with an aspheric lens. It is also possible to constitute the condenser lens 80 with a spherical lens or a plurality of lenses. By manufacturing a condenser lens with a resin having a high heat resistance, it is possible to decrease the cost and weight.

It is not restricted that the first lens array 81 and the second lens array 82 have the same shape. As long as functioning as described above, it is possible that the number of lenses and shapes are different from each other between the first lens array 81 and the second lens array 82. Moreover, it is possible to use a configuration in which the second lens 82*a* of the second lens array 82 is properly made decentering, instead of setting the beam synthesizing lens 83.

Though FIG. 8 shows a configuration of using two lamps, it is also possible to use a configuration of using two lamps or more. In this case, by using a configuration for forming the illuminant images of all lamps on the same second lens array, it is possible to obtain advantages of the present invention.

According to the above configuration, an illumination optical apparatus of the present invention is able to form an illumination luminous flux having a large light output at a high efficiency by efficiently arranging a plurality of lamp illuminant images on the aperture of the second lens. By constituting a projection display apparatus with the above illumination optical apparatus, it is possible to form a lot of illuminant images on the pupil surface of a projection lens almost symmetrically to an optical axis even if using a plurality of light sources. Therefore, it is possible to realize a bright projected image having a preferable luminance uniformity and color uniformity. Moreover, a projector can be decreased in size and cost because lights emitted from a plurality of illuminants can be efficiently synthesized without decreasing the F number of the projection lens.

(Embodiment 6)

Figure 13:
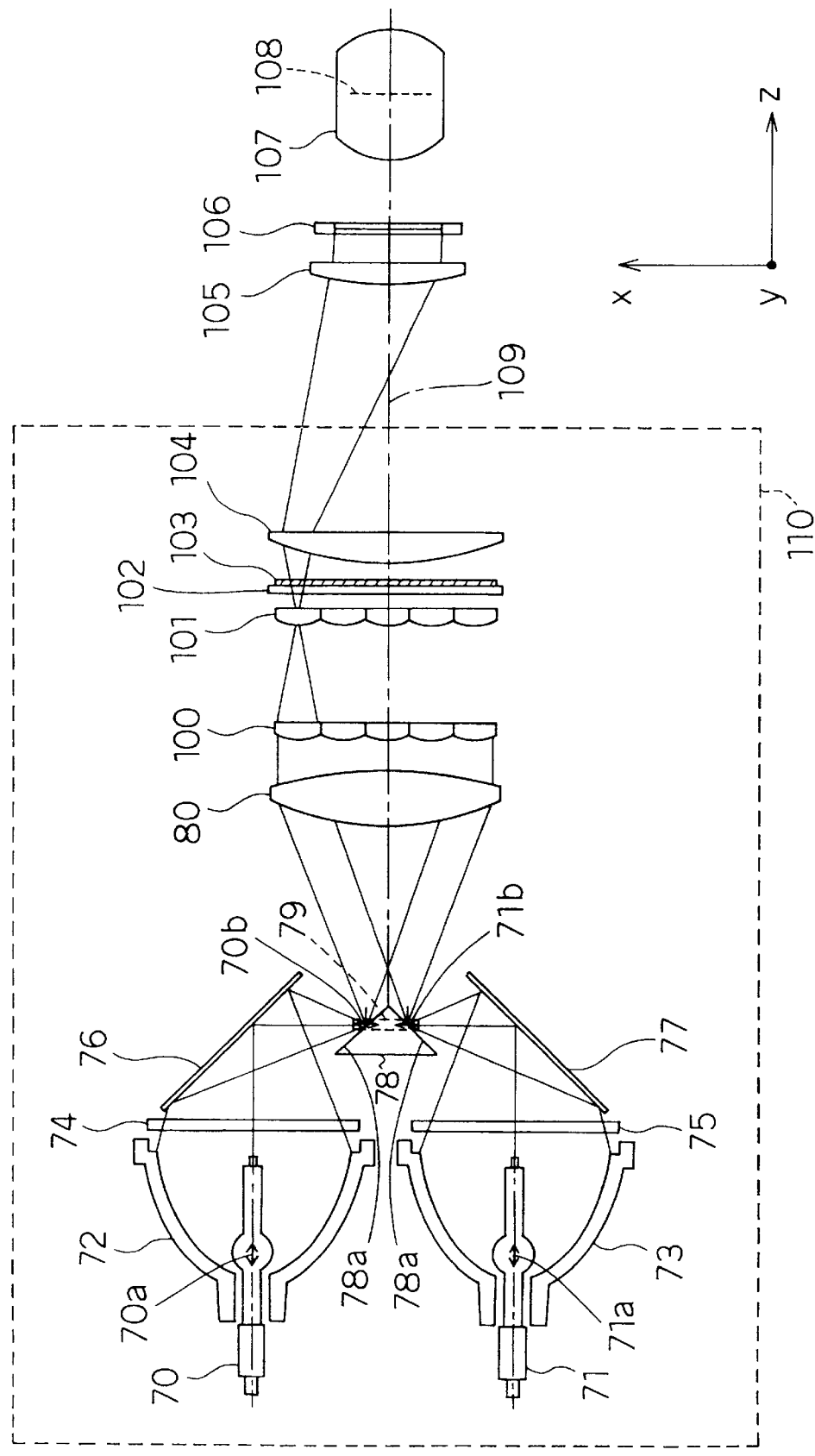
FIG. 13 is a schematic block diagram showing still another embodiment of an illumination optical apparatus of the present invention.

FIG. 13 shows still another basic configuration of an illumination optical apparatus of the present invention. The configuration from lamps 70 and 71 up to a condenser lens 80 is the same as that shown in FIG. 8. After the condenser lens 80, a first lens array 100, a second lens array 101, a polarized-light separation prism array 102, a half-wave plate 103, and a beam synthesizing lens 104 constitute an illumination optical apparatus 110.

The illumination optical apparatus 110 of the present invention is different from that shown in FIG. 8 in the following points.

Figure 14A:
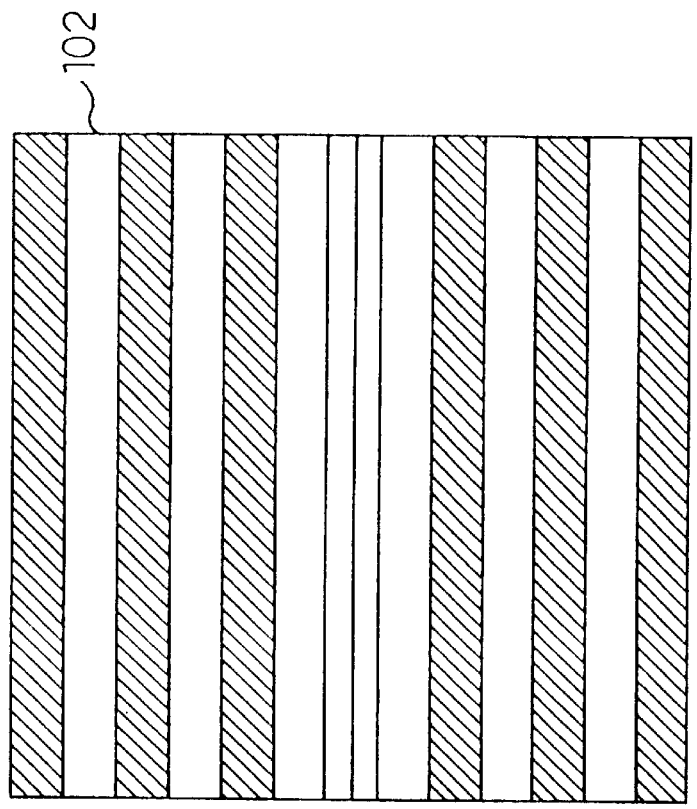
FIG. 14A is a front view of a schematic block diagram showing a configuration of a polarized-light separation prism array.
Figure 14B:
FIG. 14B is a plan view of the schematic block diagram of FIG. 14A.
Figure 14C:
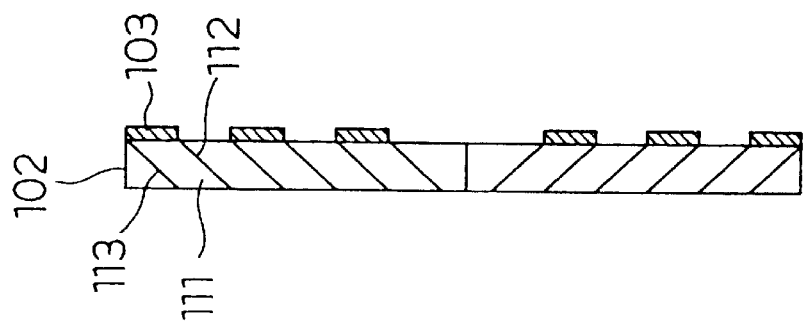
FIG. 14C is a side view of the schematic block diagram of FIG. 14A.

FIGS. 14A-14C show configurations of the polarized-light separation prism array 102 and the half-wave plate 103. The polarized-light separation prism array 102 is constituted by arranging a plurality of polarized-light separation prisms 111 in the direction almost perpendicular to a plane including illuminants 70*a* and 71*a*. In the case of FIGS. 14A-14C, the polarized-light separation prisms 111 are arranged at a pitch approx. ½ the lens pitch of the second lens array 101 in its minor-axis direction. A polarized-light separation film 112 and a reflection film 113 are alternately vapor-deposited on the junction planes between the polarized-light separation prisms 111. Moreover, the half-wave plate 103 is set to the outgoing side of the polarized-light separation prism array 102 at a pitch 2 times larger than the pitch between the polarized-light separation prisms 102.

Figure 15:
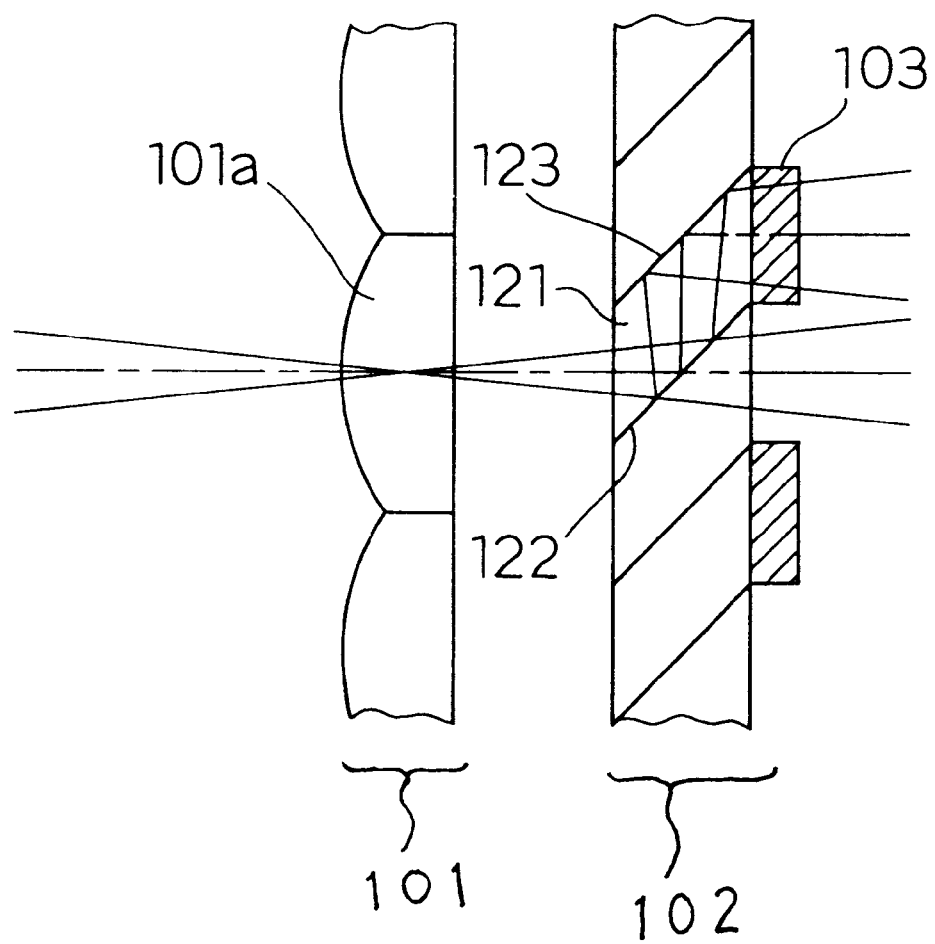
FIG. 15 is a schematic diagram for explaining functions of a polarized-light separation prism array.

Functions of the polarized-light separation prism array 102 and the half-wave plate 103 are described below by referring to FIG. 15. A second lens 101*a* of the second lens array 101 is noticed. The light emitted from the second lens 101*a* enters a polarized-light separation prism 121 in which P-polarized light passes a polarized-light separation film 122 but S-polarized light reflects from the film 122. The reflected S-polarized light enters a next reflection film 123, and it is reflected again and enters the half-wave plate 103. The half-wave plate 103 is set so as to rotate the direction of incoming polarized light up to 90° and converts the incoming S-polarized light into P-polarized light. The reflection film 123 can use a film same as the polarized-light separation film 122.

Natural light is converted into the light having one polarized-light direction by the polarized-light separation prism array 102 and half-wave plate 103 and superimposed on the liquid-crystal panel 106 by the beam synthesizing lens 104 to uniformly illuminate the display region of the liquid-crystal panel 106. In this case, a polarizer in which the polarized-light axis is adjusted to the P-polarized light is set to the incoming side of the liquid-crystal panel 106 and thereby, the light corresponding to the S-polarized light which is conventionally disused by the polarizer at the incoming side can be used. Therefore, it is possible to increase the luminous energy required to illuminate the liquid-crystal panel 106.

The pupil surface 108 of the projection lens 107 is almost conjugate with the vicinity of the surface of the second lens array 101.

Figure 16:
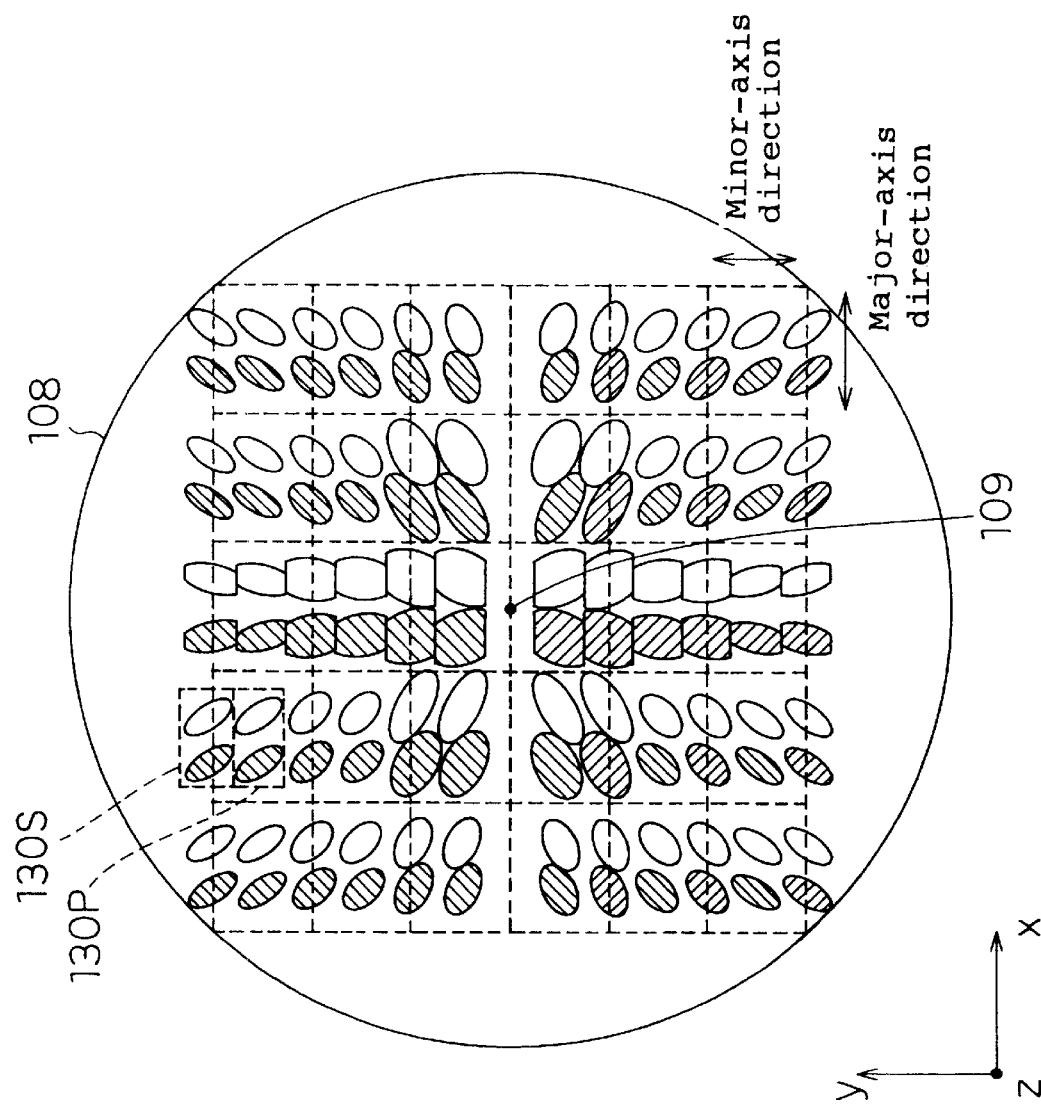
FIG. 16 is a schematic diagram showing another illuminant image on the pupil surface of a projection lens of the present invention.

FIG. 16 schematically shows the state of the pupil surface 108 of the projection lens 107. Broken lines are virtual lines showing the outline of the second lens array 101. Because the state nearby the surface of the second lens array 101 is imaged on the pupil surface 108, the illuminant image 130P of the light directly passing the polarized-light separation prism array 102 and the illuminant image 130S of the light reflected from the polarized-light separation prism array 102 and passing the half-wave plate 103 are alternately formed in the minor-axis direction. Thus, by arranging the images of two illuminants 70a and 71a in the major-axis direction of the second lens 101a and arranging the images 130P and 130S of the P-polarized light and the S-polarized light corresponding to the illuminants 70a and 71a in the minor-axis direction of the second lens 101a, it is possible to very minutely form an illuminant image and form an illumination luminous flux having a large light output at a high efficiency.

Though a configuration using two lamps is shown in FIG. 13, it is also possible to use a configuration using two lamps or more. In this case, as long as a configuration in which illuminant images of all lamps are formed on the same second lens array is used, it is possible to obtain the advantages of the present invention.

According to the above configuration, an illumination optical apparatus of the present invention makes it possible to form an illumination luminous flux having a large light output at a high efficiency by efficiently arranging a plurality of illuminant images on the aperture of a second lens. Moreover, because of arranging optical elements for converting natural light into one-directional polarized light, it is possible to greatly improve the light utilization efficiency when illuminating an element using polarized light such as a liquid-crystal panel. By constituting a projection display apparatus with the above illumination optical apparatus, it is possible to form a lot of illuminant images on the pupil surface of a projection lens almost symmetrically to an optical axis even if using a plurality of light sources. Therefore, it is possible to realize a very-bright projected image having preferable illuminance uniformity and color uniformity. Moreover, because lights emitted from a plurality of illuminants can be efficiently synthesized without decreasing the F number of a projection lens, it is possible to decrease a projector in size and cost.

(Embodiment 7)

Figure 17:
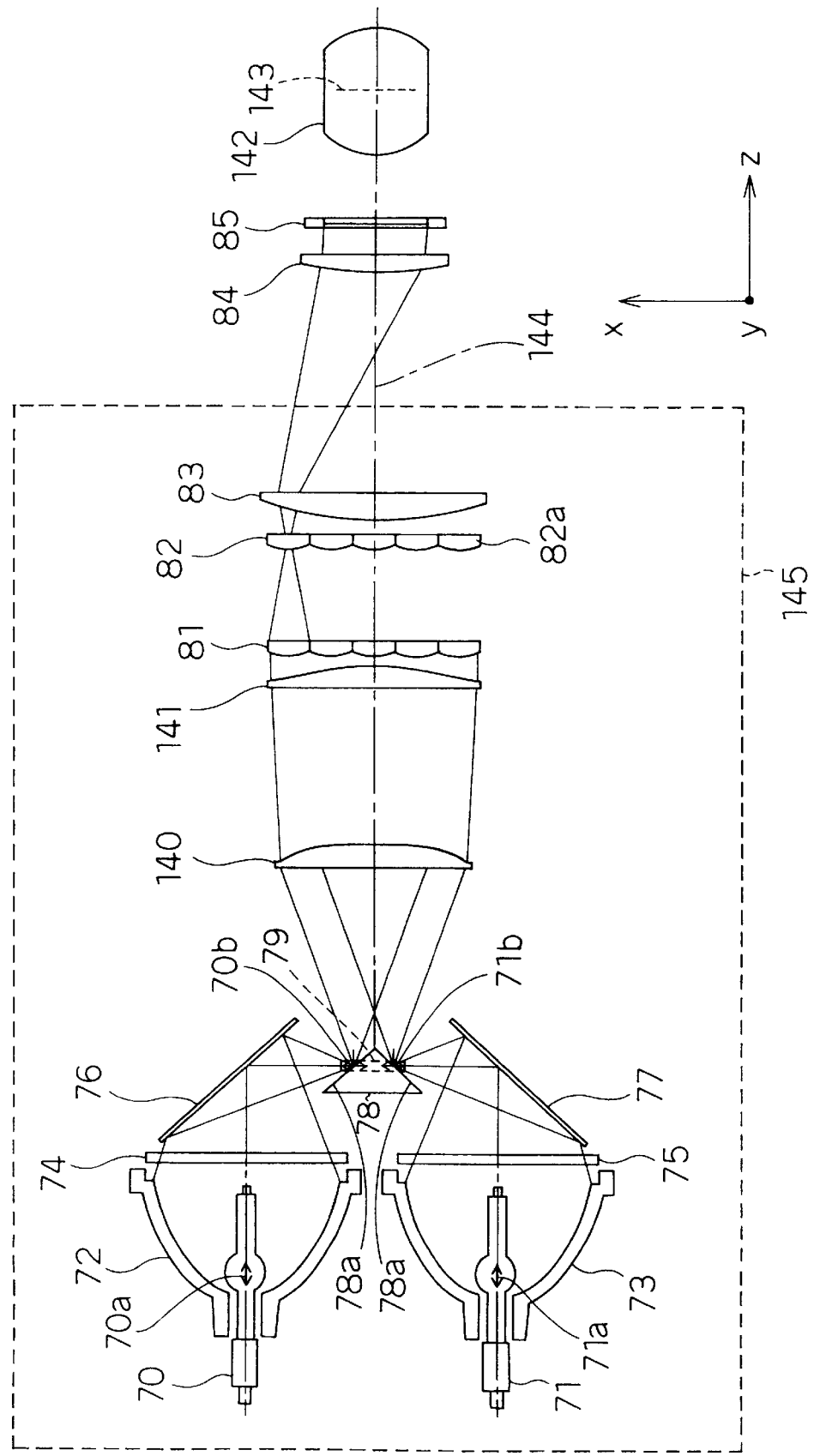
FIG. 17 is a schematic block diagram showing still another embodiment of an illumination optical apparatus of the present invention.

FIG. 17 shows still another basic configuration of an illumination optical apparatus of the present invention. The configuration from lamps 70 and 71 to a reflection prism 78 and the configuration from a first lens array 81 to a liquid-crystal panel 85 are the same as those shown in FIG. 8. However, the configuration of FIG. 17 is different from the configuration of FIG. 8 in that an input-side lens 140 and an output-side lens 141 serving as condensing means are arranged instead of the condenser lens 50.

An illumination optical apparatus 145 of the present invention is different from that shown in FIG. 8 in the following points. That is, when divergent light emitted from a secondary light source 79 enters the input-side lens 140 and output-side lens 141 in accordance with the same function as that of the lens element shown in FIG. 3, the lenses 140 and 141 emit a parallel luminous flux having almost uniform density independently of the distance from an optical axis 145. In general, when a luminous flux having an irregular density enters the first lens array 81, sizes of illuminant images formed on the second lens array 82 become irregular and a larger illuminant image is formed in a region having a larger luminous flux density. When the illuminant size of a lamp is relatively small, there is no problem. However, when the illuminant size increases, the size of an illuminant image is also proportionally increased. If circumstances require, an illuminant image larger than the aperture of the second lens 82a is formed to cause a light loss. However, by almost uniforming densities of the luminous fluxes incoming to the first lens array 81 with the input-side lens 140 and the output-side lens 141, it is possible to almost uniform the sizes of illuminant images. Therefore, it is possible to greatly reduce the above light loss.

Figure 18:
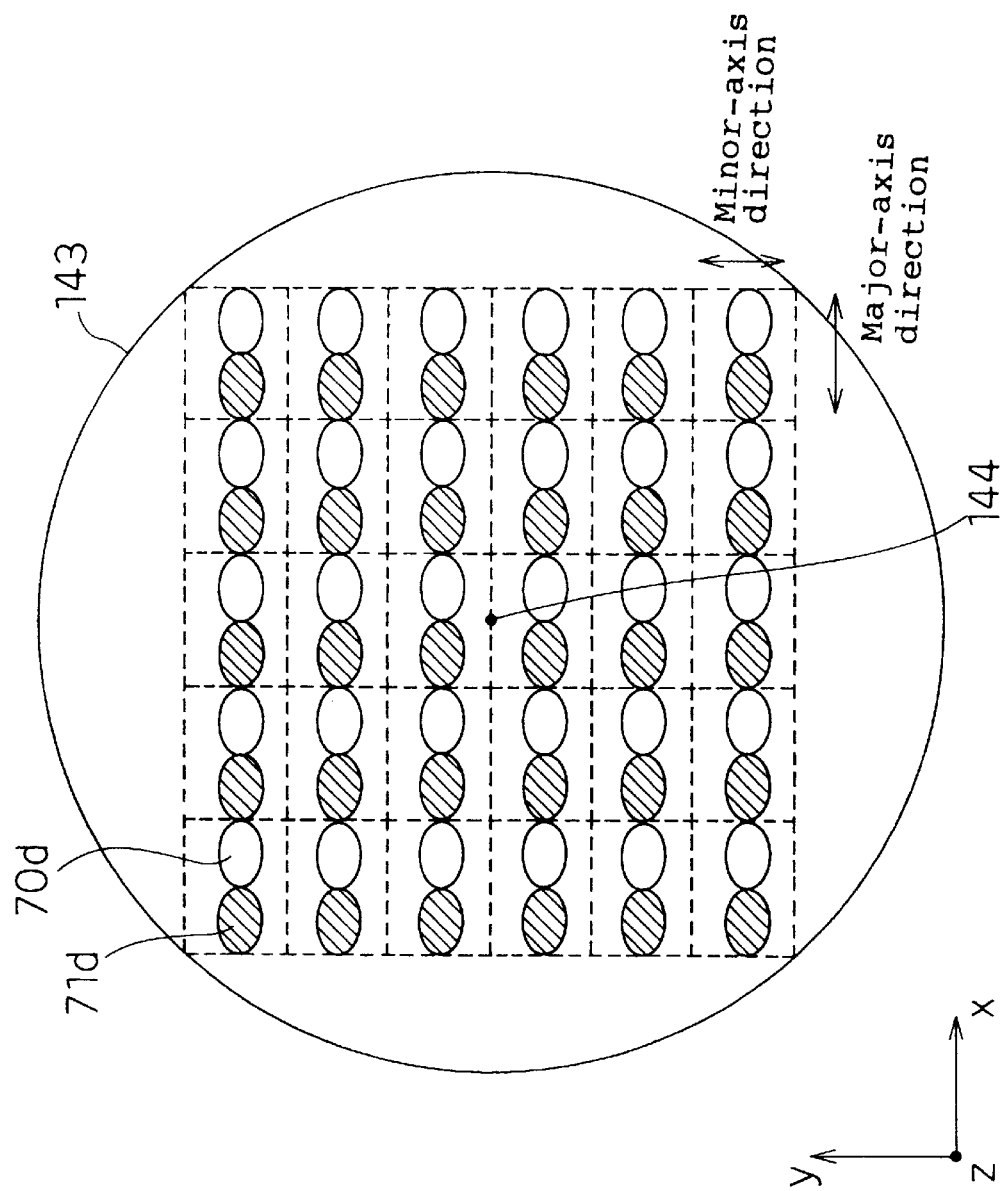
FIG. 18 is a schematic diagram showing still another illuminant image on the pupil surface of a projection lens of the present invention.

FIG. 18 schematically shows the state of the pupil surface 143 of a projection lens 142. Broken lines are virtual lines showing the outline of the second lens array 82. Because the state nearby the surface of the second lens array 82 is imaged on the pupil surface 143, illuminant images 70d and 71d whose sizes are almost uniform are formed on the pupil surface 143 in accordance with the functions of the input-side lens 140 and output-side lens 141 independently of the distance from an optical axis 144.

Though a configuration using two lamps is shown in FIG. 17, it is also possible to use a configuration using two lamps or more. In this case, as long as a configuration forms illuminant images of all lamps on the same second lens array, it is possible to obtain the advantages of the present invention.

According to the above configuration, an illumination optical apparatus of the present invention makes it possible to form an illumination luminous flux having a large light output at a high efficiency by efficiently arranging a plurality of illuminant images on the aperture of a second lens. Moreover, by arranging an input-side lens and an output-side lens and almost uniforming densities of the parallel luminous fluxes incoming to a first lens array, sizes of the illuminant images are uniformed. Therefore, even if the size of an illuminant increases, a high light-utilization efficiency can be realized. By constituting a projection display apparatus with the above illumination optical apparatus, it is possible to form a lot of illuminant images on the pupil surface of a projection lens almost symmetrically to an optical axis even if using a plurality of light sources. Therefore, it is possible to brightly realize a projected image having preferable illuminance uniformity and color uniformity. Moreover, it is possible to decrease a projector in size and cost because lights emitted from a plurality of illuminants can be efficiently synthesized without decreasing the F number of the projection lens.

(Embodiment 8)

Figure 19:
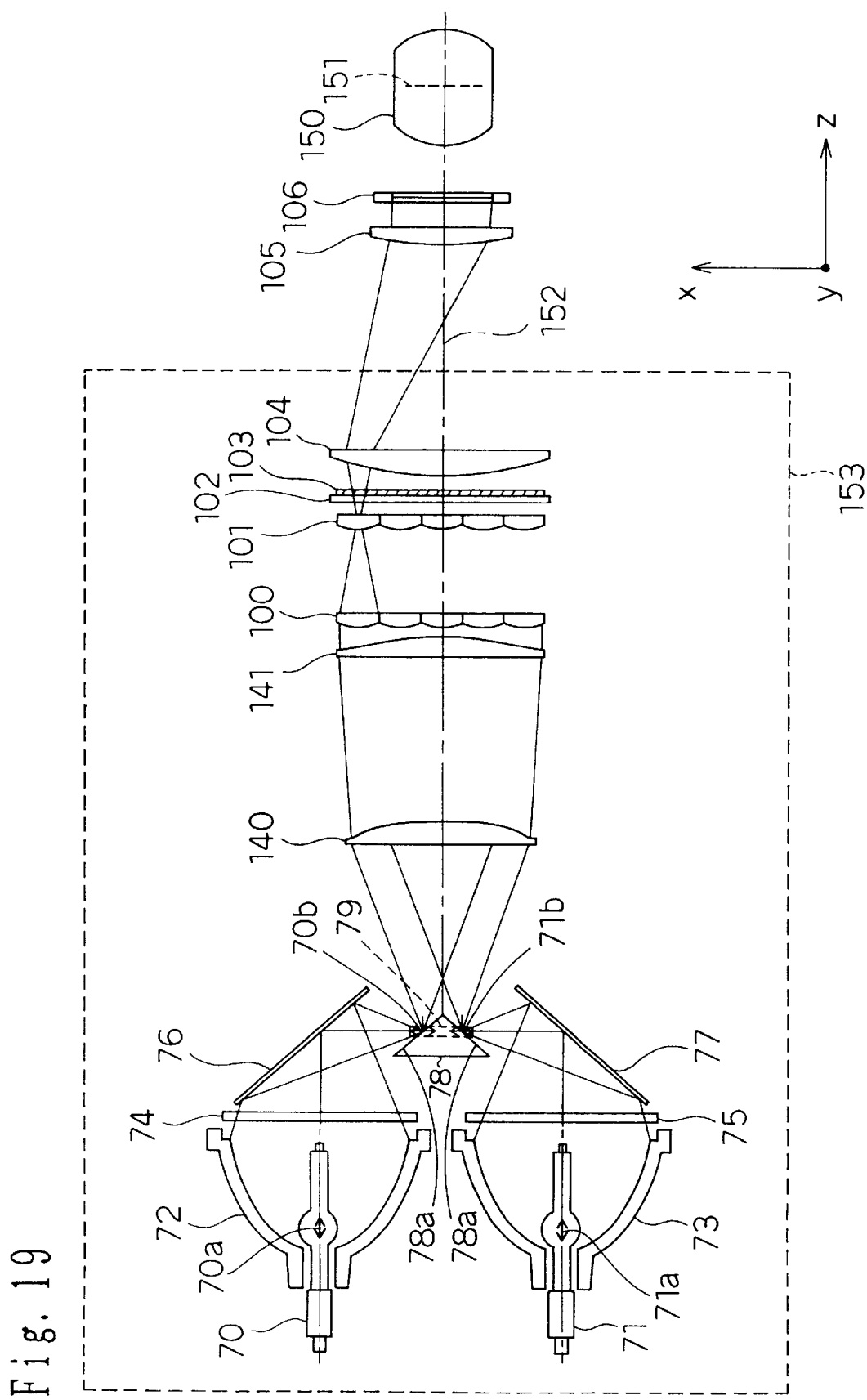
FIG. 19 is a schematic block diagram showing still another embodiment of an illumination optical apparatus of the present invention.

FIG. 19 shows still another basic configuration of an illumination optical apparatus of the present invention. Other configurations of FIG. 19 are the same as those of FIG. 13 except that an input-side lens 140 and an output-side lens 141 are arranged instead of the condenser lens 50.

The input-side lens 140 and output-side lens 141 convert the divergent light emitted from a secondary light source 79 into parallel luminous fluxes having an almost uniform density. The elements from a first lens array 100 to a beam synthesizing lens 104 efficiently lead the outgoing light of the output-side lens 141 to a liquid-crystal panel 106 and uniformly illuminate the display region of the liquid-crystal panel 106 in accordance with the action described in FIG. 14.

Figure 20:
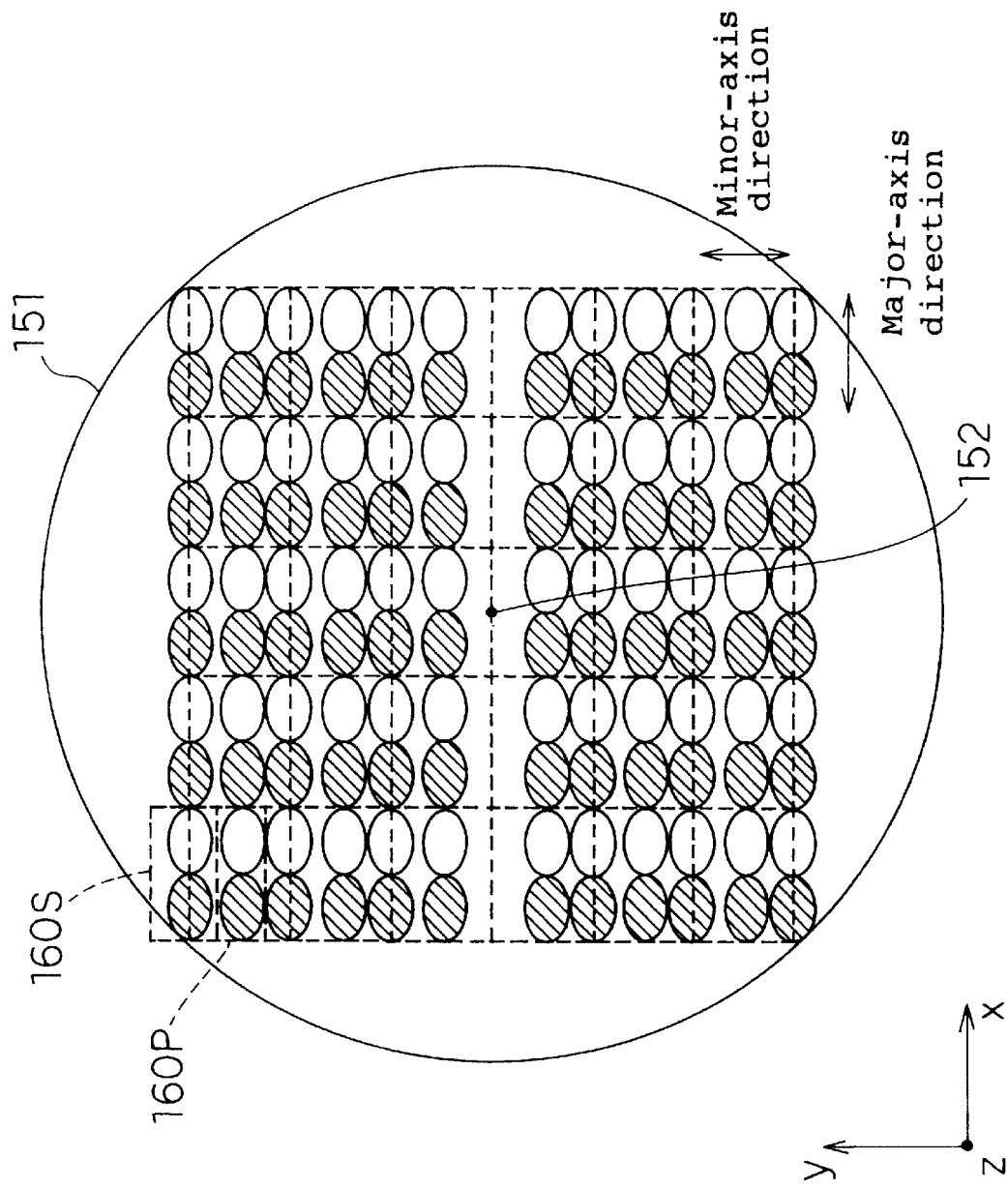
FIG. 20 is a schematic diagram showing still another illuminant image on the pupil surface of a projection lens of the present invention.

FIG. 20 schematically shows the state of the pupil surface 151 of a projection lens 150. Broken lines are virtual lines showing the outline of a second lens array 101. Because the state nearby the surface of the second lens array 101 is imaged on the pupil surface 151, the illuminant image 160P of the light directly passing a polarized-light separation prism array 102 and the illuminant image 160S of the light reflected from the polarized-light separation prism array 102 and passing a half-wave plate 103 are alternately formed in the minor-axis direction.

Though a configuration using two lamps is shown in FIG. 19, it is also possible to use a configuration using two lamps or more. In this case, as long as a configuration forms illuminant images of all lamps on the same lens array, it is possible to obtain the advantages of the present invention.

According to the above configuration, an illumination optical apparatus of the present invention makes it possible to form an illumination luminous flux having a large light output at a high efficiency by efficiently arranging a plurality of illuminant images on the aperture of a second lens. Moreover, by arranging an input-side lens and an output-side lens and almost uniforming densities of the parallel luminous fluxes incoming to a first lens array, sizes of illuminant images are uniformed. Therefore, even if the size of an illuminant increases, it is possible to realize a high light-utilization efficiency. Furthermore, because of arranging optical elements for converting natural light into one-directional polarized light, it is possible to greatly improve the light-utilization efficiency when illuminating an element using polarized light such as a liquid-crystal panel. By constituting a projection display apparatus with the above illumination optical apparatus, it is possible to form a lot of illuminant images on the pupil surface of a projection lens almost symmetrically to an optical axis even if using a plurality of light sources. Therefore, it is possible to realize a very-bright projected image having preferable illuminance uniformity and color uniformity. Furthermore, because lights emitted from a plurality of illuminants can be efficiently synthesized without decreasing the F number of the projection lens, it is possible to decrease a projector in size and cost.

(Embodiment 9)

Figure 21:
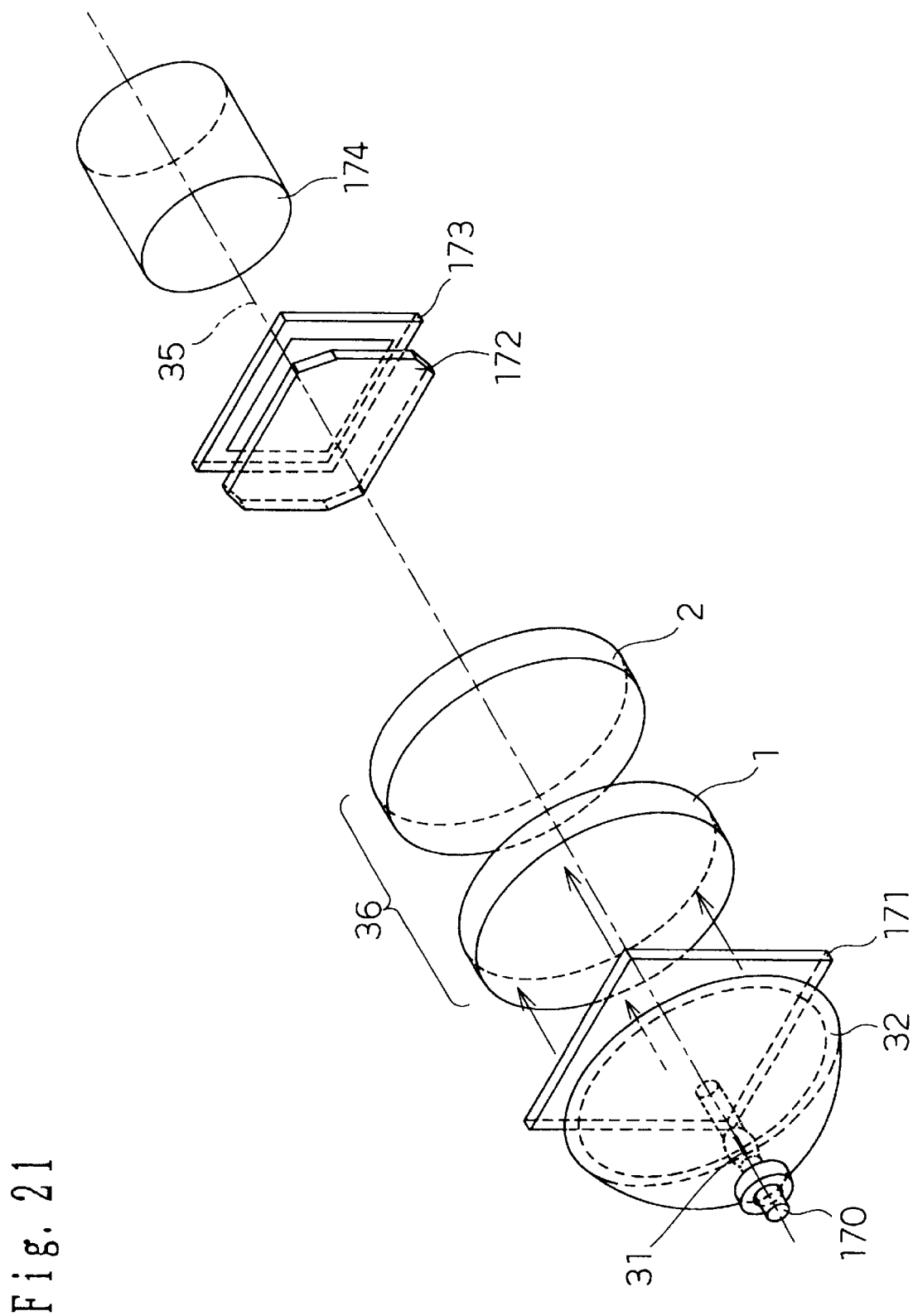
FIG. 21 is a schematic block diagram showing an embodiment of a projection display apparatus of the present invention.

FIG. 21 shows a basic configuration of a projection display apparatus of the present invention. The projection display apparatus is constituted with a lamp 170, a parabolic mirror 32, a UV-IR cut filter 171, an input-side lens 1, an output-side lens 2, a field lens 172, a liquid-crystal panel 173, and a projection lens 174. The input-side lens 1 and the output-side lens 2 are shown as discoid lenses for convenience' sake. However, the configuration, functions, and advantages of an illumination optical apparatus constituted by combining a lens element 36 constituted with a group of these lenses and the parabolic mirror 32 are the same as those of the above embodiment described by referring to FIGS. 1 and 4.

Harmful ultraviolet light and infrared light are removed from the light emitted from an illuminant 31 by the UV-IR cut filter 171 and changed to illumination light having a high brightness uniformity by a lens element 36 of the present invention, and pass the field lens 172 to illuminate the display region of the liquid-crystal panel 173. The liquid-crystal panel 173 is an active-matrix-system color liquid-crystal panel provided with red, green, and blue filters, which modulates light by controlling the voltage applied to a pixel corresponding to a video signal and forms a color optical image. This optical image is enlarged and projected onto a screen (not illustrated) by the projection lens 174.

It is also possible to use a configuration constituted by arranging two lens arrays at the outgoing side of the output-side lens 2. In this case, it is possible to improve the light-utilization efficiency because illuminant images having almost uniform sizes are formed on the lens arrays.

According to the above configuration, a projection display apparatus of the present invention makes it possible to obtain a projected image having a high uniformity because luminous fluxes having irregular densities condensed by a parabolic mirror are changed to luminous fluxes having relatively uniform densities by the input- and output-side lenses to illuminate the liquid-crystal panel.

(Embodiment 10)

Figure 22:
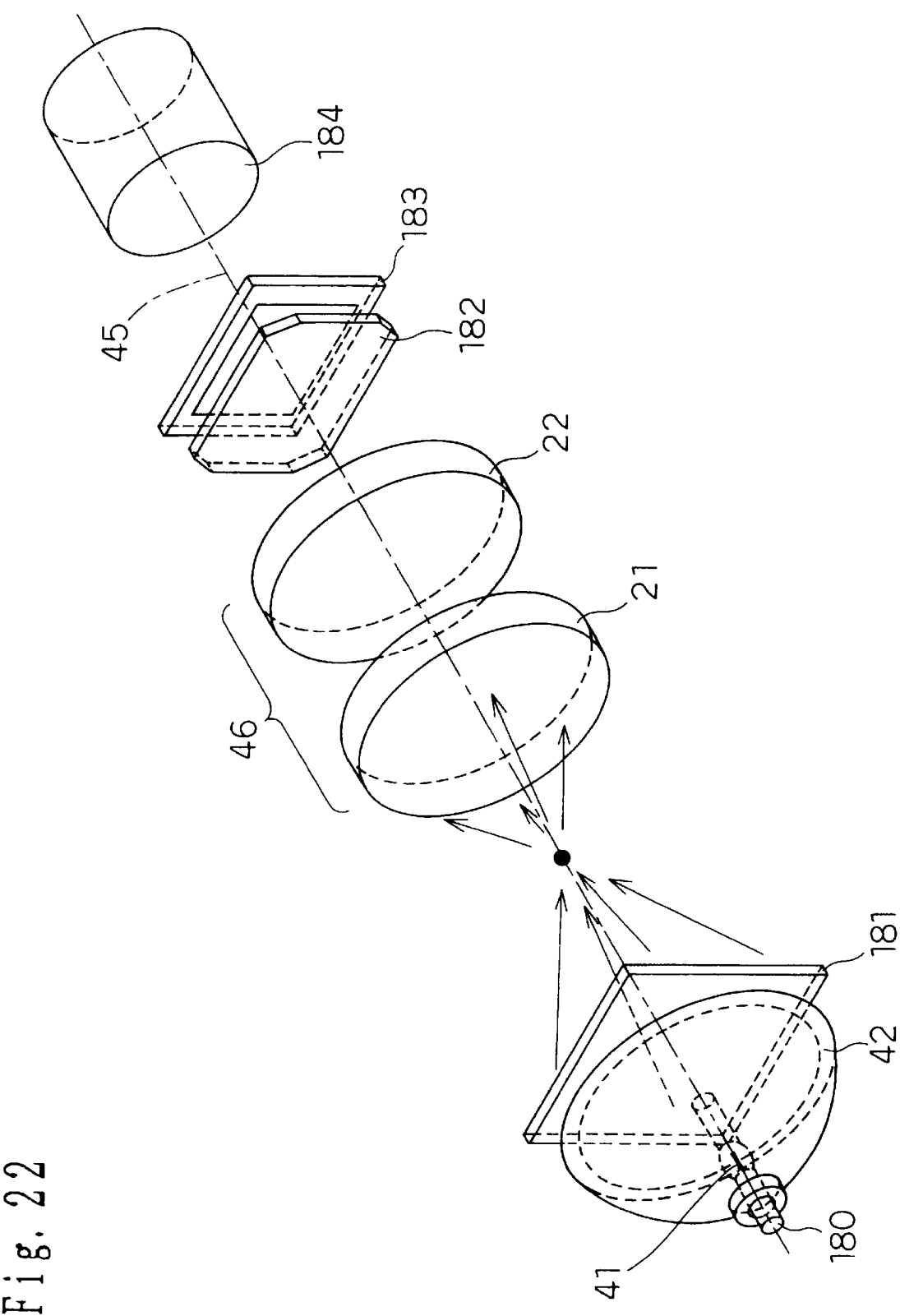
FIG. 22 is a schematic block diagram showing another embodiment of a projection display apparatus of the present invention.

FIG. 22 shows another basic configuration of a projection display apparatus of the present invention. The projection display apparatus is constituted with a lamp 180, an ellipsoidal mirror 42, a UV-IR cut filter 181, an input-side lens 21, an output-side lens 22, a field lens 182, a liquid-crystal panel 183, and a projection lens 184. The input-side lens 21 and the output-side lens 22 are shown as discoid lenses for convenience' sake. However, the configuration, functions, and advantages of an illumination optical apparatus constituted by combining a lens element 46 constituted with a group of these lenses and the parabolic mirror 42 are the same as those of the above embodiment described by referring to FIGS. 3 and 5.

It is also possible to use a configuration constituted by arranging two lens arrays at the outgoing side of the output-side lens 22. In this case, it is possible to improve the light-utilization efficiency because illuminant images having almost uniform sizes are formed on the lens arrays.

According to the above configuration, a projection display apparatus of the present invention makes it possible to obtain a projected image having a high uniformity because luminous fluxes having irregular densities condensed by an ellipsoidal mirror are changed to luminous fluxes having relatively uniform densities by input- and output-side lenses to illuminate a liquid-crystal panel.

(Embodiment 11)

Figure 23:
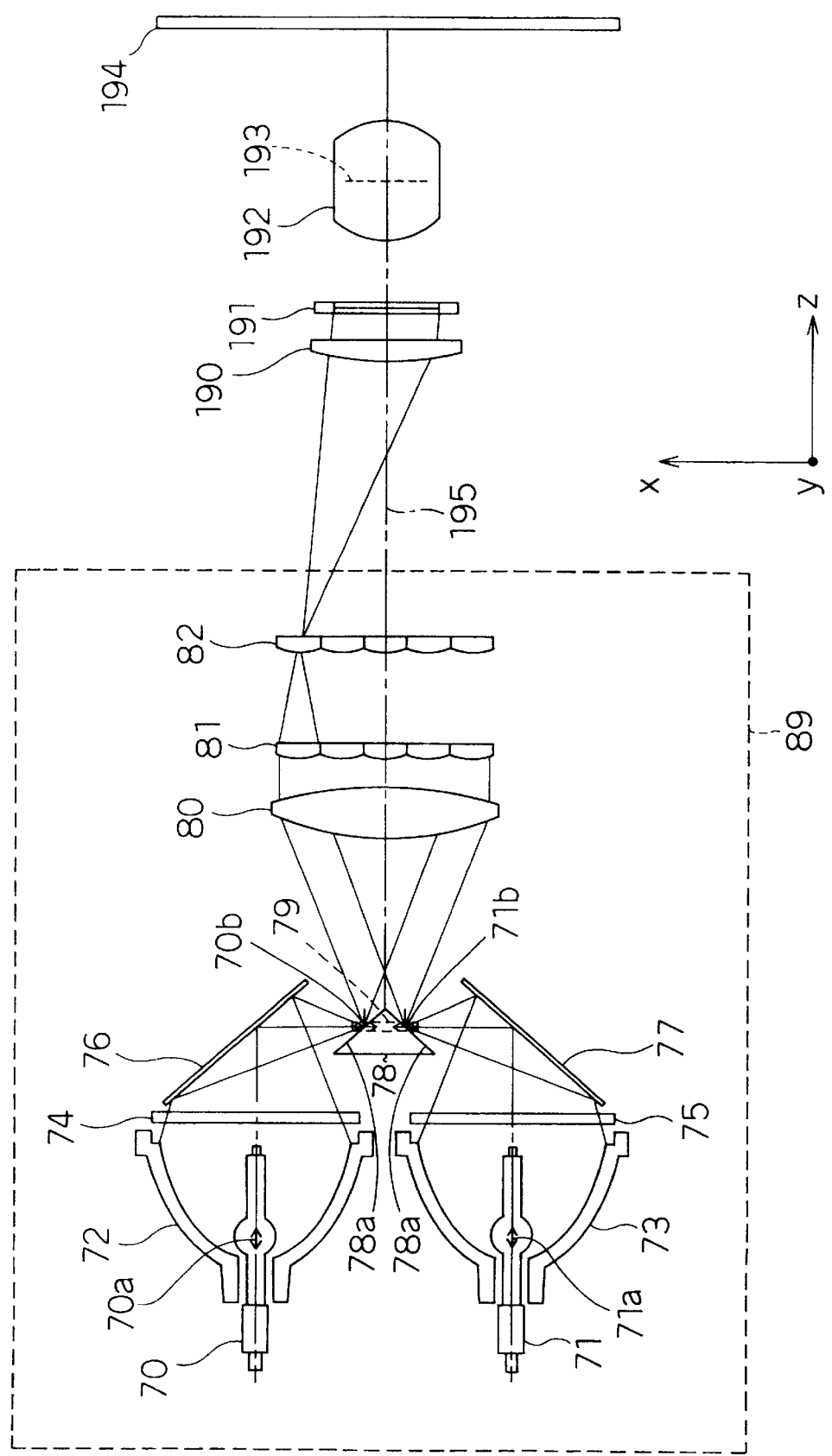
FIG. 23 is a schematic block diagram showing still another embodiment of a projection display apparatus of the present invention.

FIG. 23 shows still another basic configuration of a projection display apparatus of the present invention. The projection display apparatus is constituted with an illumination optical apparatus 89, a field lens 190, a liquid-crystal panel 191, a projection lens 192, and a screen 194. The illumination optical apparatus 89 has a configuration same as that shown in FIG. 8.

The illumination optical apparatus 89 forms an illumination luminous flux having high brightness and color uniformities and a large light output to illuminate the liquid-crystal panel 191. The light passing the liquid-crystal panel 191 is enlarged and projected onto the screen 194 by the projection lens 192. The illuminant images shown in FIG. 11 are formed on the pupil surface 193 of the projection lens 192 almost symmetrically to an optical axis 195.

It is also possible to use the illumination optical apparatus of the present invention shown in FIG. 13, 17, or 19 using a lens element and polarized-light separation means of the present invention as an illumination optical apparatus.

According to the above configuration, a projection display apparatus of the present invention can be constituted as a projection display apparatus having a preferable projected-image uniformity, a bright projected-image and a high light-utilization efficiency with an illumination optical apparatus using a plurality of lamps. Because of using one liquid-crystal panel, it is possible to constitute a compact and low-cost projection display apparatus.

(Embodiment 12)

Figure 24:
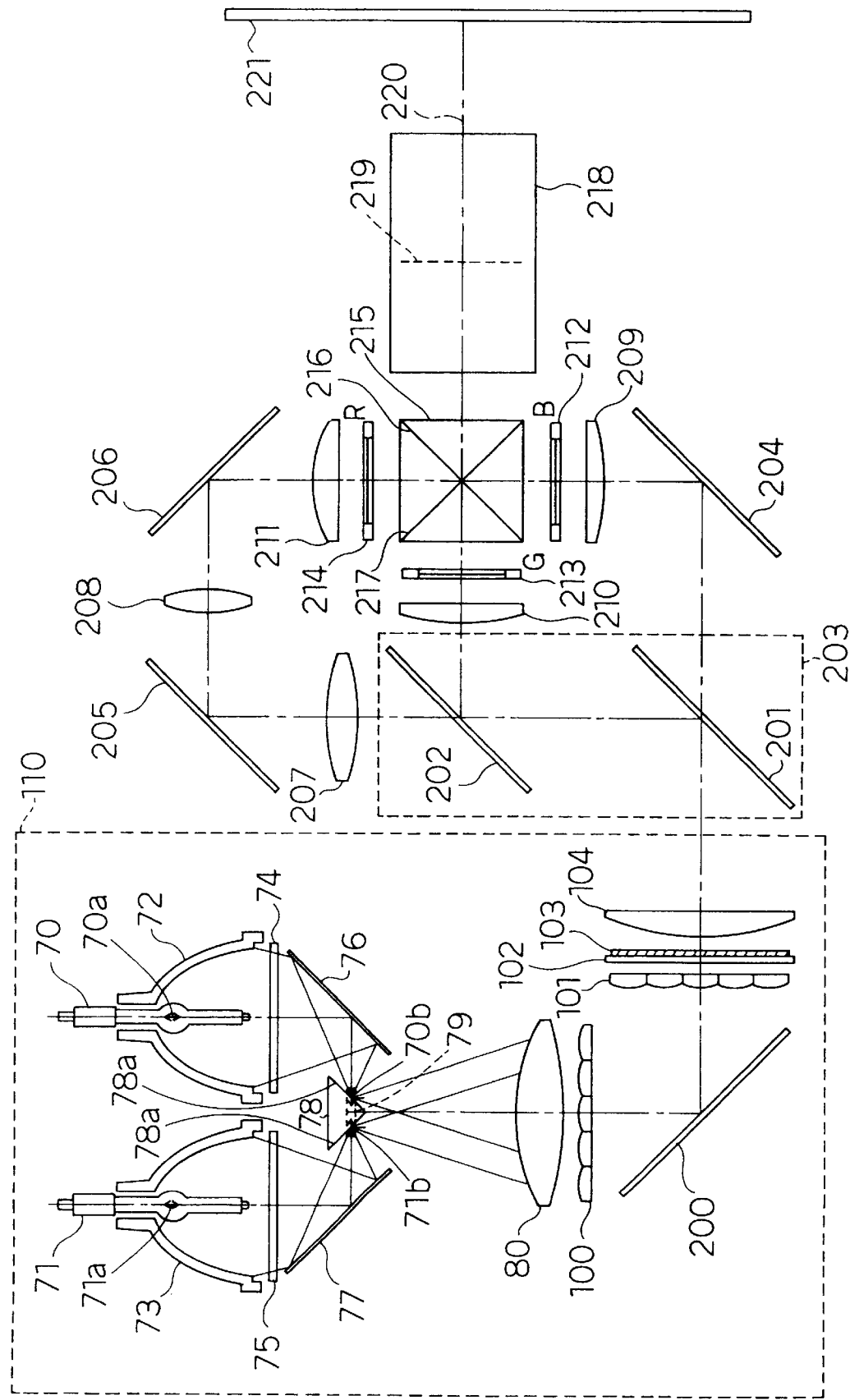
FIG. 24 is a schematic block diagram showing still another embodiment of a projection display apparatus of the present invention.

FIG. 24 shows still another basic configuration of a projection display apparatus of the present invention. The projection display apparatus is constituted with an illumination optical apparatus 110; dichroic mirrors 201, 202, 216, and 217; plane mirrors 200, 204, 205, and 206; relay lenses 207 and 208; field lenses 209, 210, and 211; liquid-crystal panels 212, 213, and 214; a dichroic prism 215; a projection lens 218; and a screen 221. The illumination optical apparatus 110 has the same configuration as that shown in FIG. 13. However, a plane mirror 200 is set between a first lens array 100 and a second lens array 101 to bend an optical path.

The light emitted from the illumination optical apparatus 110 enters color separation means 203. The light entering the color separation means 203 is separated into primary colors of red, green, and blue by the red-and-green-reflecting dichroic mirror 201 and the green-reflecting dichroic mirror 202. Blue and green lights pass the field lenses 209 and 210 and enter the liquid-crystal panels 212 and 213. Red light passes the relay lenses 207 and 208 and the field lens 211 and enters the liquid-crystal panel 214. The plane mirrors 204, 205, and 206 are arranged in blue and red optical paths to bend the paths. Three liquid-crystal panels 212, 213, and 214 respectively use the active matrix system and modulate light by controlling the voltage applied to a pixel corresponding to a video signal to form blue, green, and red optical images. Lights passing the liquid-crystal panels 212, 213, and 214 are synthesized by the dichroic prism 215 serving as a color synthesizing means, and enlarged and projected onto the screen 221 by the projection lens 218. The illuminant images shown in FIG. 16 are formed on the pupil surface 219 of the projection lens 218.

It is also possible to use the illumination optical apparatus of the present invention shown in FIG. 8, 17, or 19.

According to the above configuration, a projection display apparatus of the present invention can be constituted as a bright projection display apparatus having a preferable projected-image uniformity and a high light-utilization efficiency by using an illumination optical apparatus using a plurality of lamps. Because three liquid-crystal panels are used, it is possible to constitute a bright high-precision projection display apparatus.

(Embodiment 13)

Figure 25:
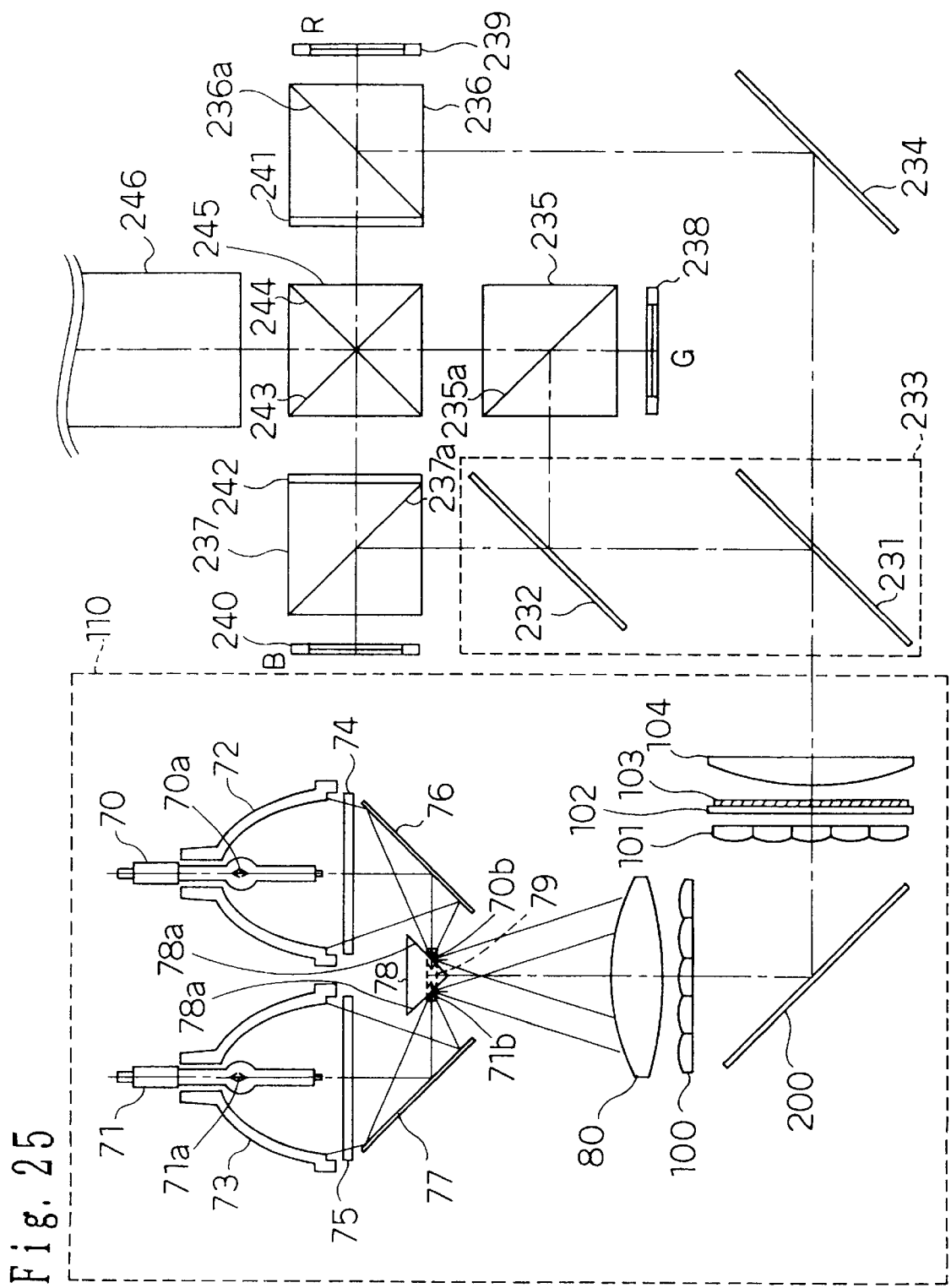
FIG. 25 is a schematic block diagram showing still another embodiment of a projection display apparatus of the present invention.
Figure 26:
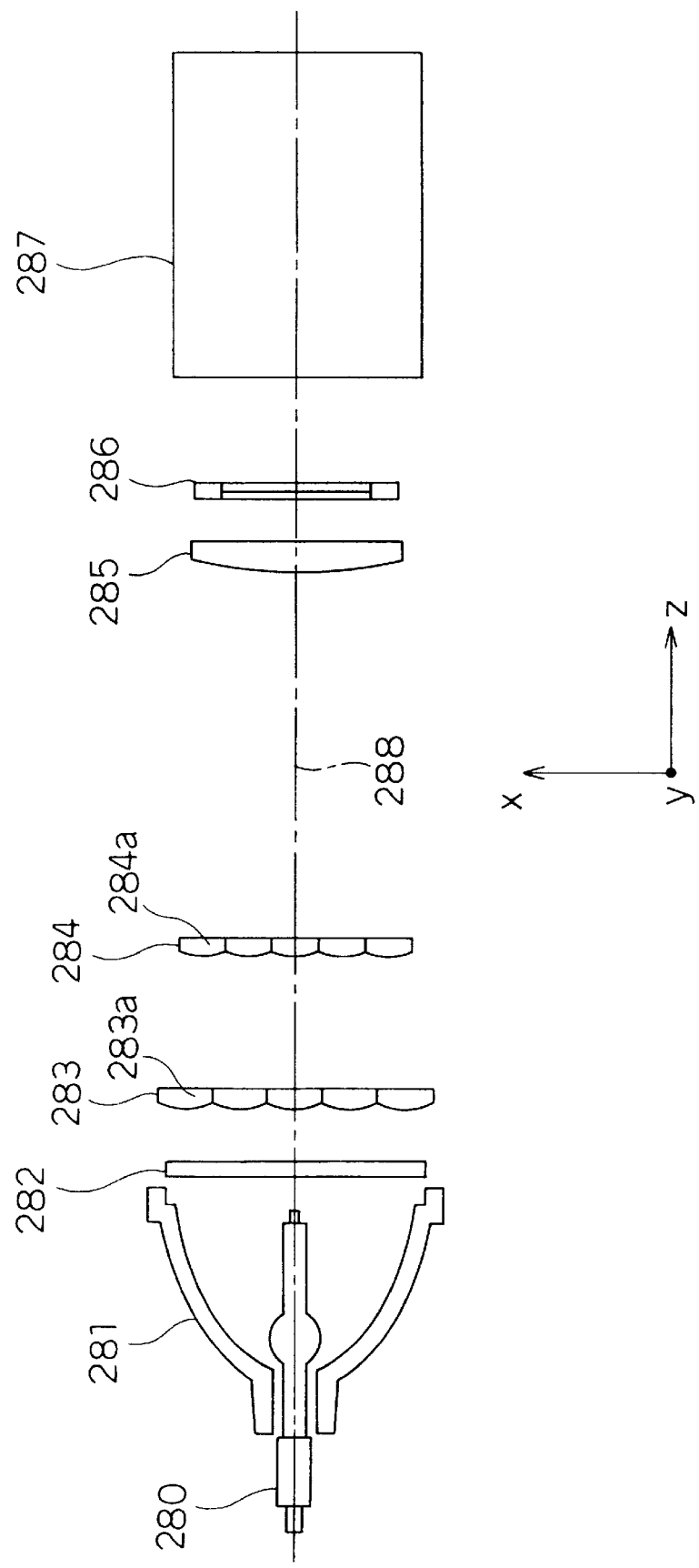
FIG. 26 is a schematic block diagram showing an embodiment of a conventional projection display apparatus.
Figure 27:
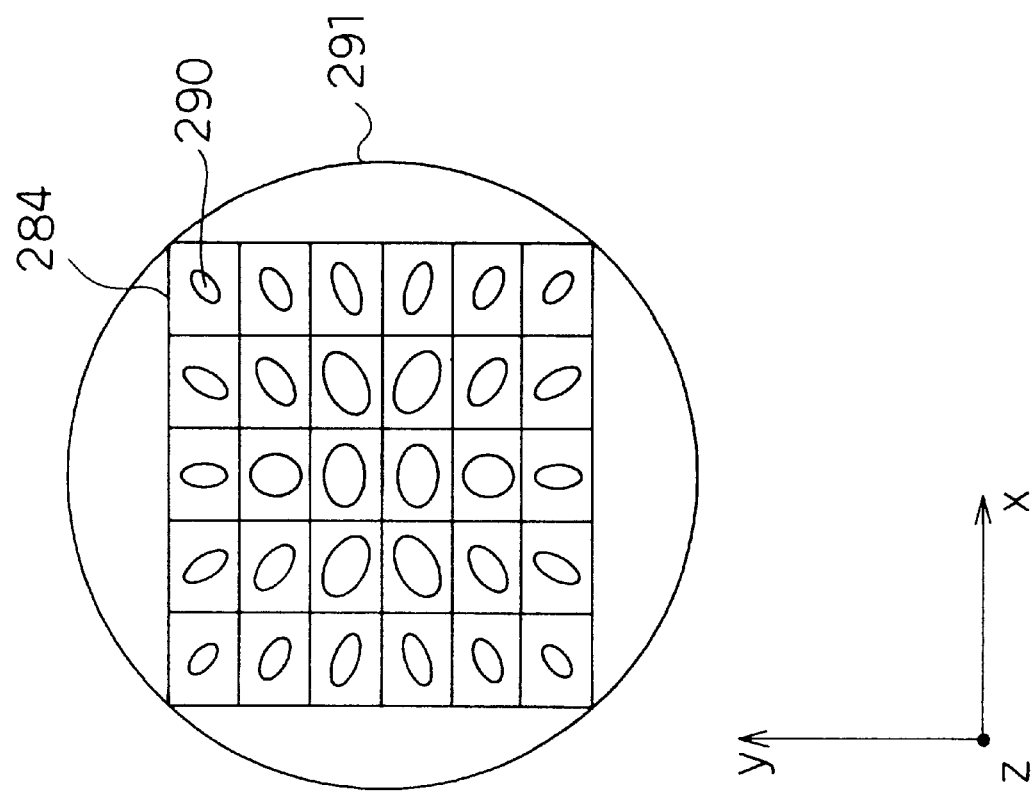
FIG. 27 is a schematic diagram showing an illuminant image on a conventional second lens array.

FIG. 25 shows still another basic configuration of a projection display apparatus of the present invention. The projection display apparatus is constituted with an illumination optical apparatus 110; dichroic mirrors 231, 232, 243, and 244; a plane mirror 234; polarized-light separation prisms 235, 236, and 237; reflection-type liquid-crystal panels 238, 239, and 240; half-wave plates 241 and 242; a dichroic prism 245; and a projection lens 246.

The light emitted from the illumination optical apparatus 110 enters color separation means 233. The light entering the color separation means 233 is separated into red, green, and blue lights by the red-transmitting dichroic mirror 231 and the green-reflecting dichroic mirror 232. Divided red, green, and blue color lights enter the polarized-light separation prisms 235, 236, and 237. The polarized-light separation prisms 235, 236, and 237 are prisms having polarized-light separation films 235a, 236a, and 237a respectively constituted with a dielectric multilayer film. The polarized-light separation films 235a, 236a, and 237a respectively have an incident angle of 45° and make P-polarized light pass the surfaces of the polarized-light separation films and S-polarized light reflect from the surfaces. The reflected S-polarized red, green, and blue lights enter the reflection-type liquid-crystal panels 238, 239, and 240. The reflection-type liquid-crystal panels 238, 239, and 240 respectively use the active matrix system and are respectively provided with a liquid-crystal layer and a reflection film. Liquid crystal uses homeotropic liquid crystal, HAN mode liquid crystal, or 45°-twisted nematic liquid crystal. When a voltage is applied to the reflection-type liquid-crystal panel 238, 239, or 240 in accordance with a video signal, birefringence of liquid crystal is changed. When the light incoming to the reflection-type liquid-crystal panels 238, 239, and 240 passes a liquid-crystal layer and reflects from a reflection film, and passes the liquid-crystal layer again, the polarized state of the light is changed from S-polarized light to P-polarized light due to birefringence and emitted. Green P-polarized light emitted from the reflection-type liquid-crystal panel 238 passes the polarized-light separation prism 235 and then, enters the dichroic prism 245 serving as color synthesizing means. Red and blue P-polarized lights emitted from the reflection-type liquid-crystal panels 239 and 240 pass the polarized-light separation prisms 236 and 237 and their polarization directions are rotated to the S-polarized-light direction by the half-wave plates 241 and 242. Then, the lights enter the dichroic prism 245. The red and blue lights are synthesized by the dichroic prism 245 and then, enlarged and projected onto a screen (not illustrated) by the projection lens 246.

On the other hand, S-polarized light whose polarized states are not changed by the reflection-type liquid-crystal panels 238, 239, and 240 reflects from the polarized-light separation prisms 235, 236, and 237 and returns to the illumination optical apparatus 110. Thus, an optical image formed as the change of polarized-light states by the reflection-type liquid-crystal panels 238, 239, and 240 is enlarged and projected onto a screen (not illustrated) and a full-color projected image is formed.

It is also possible to use the illumination optical apparatus of the present invention shown in FIG. 8, 17, or 19 as the illumination optical apparatus.

According to the above configuration, a projection display apparatus of the present invention can be constituted as a projection display apparatus having a preferable projected-image uniformity, a bright projected-image and a high light-utilization efficiency by using the illumination optical apparatus employing a plurality of lamps. Because three reflection-type liquid-crystal panels are used, it is possible to constitute a bright high-precision projection display apparatus.

For the above embodiments, a case is described in which a liquid-crystal panel using polarized light is used as a spatial optical modulator. However, it may be also possible to use a liquid-crystal panel using scattering or a spatial optical modulator for forming an optical image corresponding to a video signal as the change of diffraction or reflection. Moreover, it may be possible to constitute a projection display apparatus for rear projection by using a transmission screen.

What is claimed is:

1. An illumination optical apparatus for illuminating a predetermined region by condensing the lights emitted from a plurality of illuminants, comprising:

the plurality of illuminants;

a first condensing means for condensing the lights emitted from the illuminants;

a light synthesizing means for synthesizing the lights condensed by the first condensing means and emitting the synthesized light in a predetermined direction;

a second condensing means into which the light emitted from the light synthesizing means comes to emit substantially parallel light;

a first lens array constituted with a plurality of lenses to divide the light supplied from the second condensing means into a plurality of luminous fluxes;

a second lens array constituted with a plurality of lenses and into which the light supplied from the first lens array comes, wherein images corresponding to the illuminants are formed on each same aperture of the lenses constituting the second lens array.

2. An illumination optical apparatus according to claim 1, wherein said illuminants are two illuminants, said lenses constituting said second lens array have a generally rectangular shape having a major axis and a minor axis, said two illuminants are disposed on a same plane including an optical axis substantially parallel to said major axis, and images of said two illuminants are disposed on each same aperture of said lenses and in a direction of said major axis.

3. An illumination optical apparatus according to claim 1, wherein said lenses constituting said second lens array have a generally rectangular shape, having a major axis and a minor axis, and images of said plural illuminants are disposed on each same aperture of said lenses and in a direction of said major axis.

4. An illumination optical apparatus according to claim 1, wherein said illuminants are two illuminants, said lenses constituting said second lens array have a generally rectangular shape, having a major axis and a minor axis, and images of said two illuminants are disposed on each same aperture of said lenses and in a direction of said major axis.

5. A projection display apparatus comprising:

an illumination optical apparatus for forming illuminants light according to claim 1;

a spatial optical modulator into which the light supplied from the illumination optical apparatus comes to form an optical image in accordance with a video signal; and a projection means for projecting an optical image on the spatial optical modulator onto a screen.

6. A projection display apparatus comprising:

an illumination optical apparatus for forming illumination light according to claim 3;

a spatial optical modulator into which the light supplied from the illumination optical apparatus comes to form an optical image in accordance with a video signal; and a projection means for projecting an optical image on the spatial optical modulator onto a screen.

7. A projection display apparatus comprising:

an illumination optical apparatus for forming illumination light according to claim 4;

a spatial optical modulator into which the light supplied from the illumination optical apparatus comes to form an optical image in accordance with a video signal; and a projection means for projecting an optical image on the spatial optical modulator onto a screen.

8. An illumination optical apparatus for illuminating a predetermined region by condensing the lights emitted from a plurality of illuminants, comprising:

the plurality of illuminants;

a first condensing means for condensing the lights emitted from the plurality of illuminants;

a light synthesizing means for synthesizing the lights condensed by the first condensing means and emitting the synthesized light in a predetermined direction;

a second condensing means into which the light emitted from the light synthesizing means comes to emit substantially parallel light;

a first lens array constituted with a plurality of lenses to divide the lights supplied from the second condensing means into a plurality of luminous fluxes;

a second lens array constituted with a plurality of lenses and into which the light supplied from the first lens array comes;

a polarized-light separation means into which the light supplied from the second lens array comes to separate natural light into two linearly polarized lights whose polarization directions are perpendicular to each other; and a polarized-light rotation means into which the light supplied from the polarized-light separation means comes to rotate the polarizataion direction of at least one of the two lineraly polarized lights, wherein images corresponding to the illuminants are formed on each same aperture of the plural lenses constituting the second lens array.

9. The illumination optical apparatus according to claim 8, wherein the lenses constituting the second lens array are rectangles respectively having a major axis and a minor axis, the illuminants are arranged on the same plane substantially parallel with the major axis and the images of the illuminants are arranged along the direction of the major axis on each same aperture of the plural lenses, and the polarized-light separation means uses a polarized-light separation prism array constituted by arranging a plurality of polarized-light separation prisms respectively provided with a polarized-light separation film at a constant pitch in the direction of the minor axis.

10. The illumination optical apparatus according to claim 8, wherein said plural illuminants are two illuminants, the lenses constituting the second lens array are rectangles respectively having a major axis and a minor axis, the two illuminants are arranged on the same plant substantially parallel with the major axis and the images of the two illuminants are arranged along the direction of the major axis on each same aperture of the plural senses; and the polarized-light separation means uses a polarized-light separation prism array constituted by arranging a plurality of polarized-light separation prisms respectively provided with a polarized-light separation film at a constant pitch in the direction of the minor axis.

11. A projection display apparatus comprising:

an illumination optical apparatus for forming illumination light according to claim 8;

a spatial optical modulator into which the light supplied from the illumination optical apparatus comes to form an optical image in accordance with a video signal; and a projection means for projecting an optical image on the spatial optical modulator onto a screen.

12. A projection display apparatus comprising:

an illumination optical apparatus for forming illumination light according to claim 9;

a spatial optical modulator into which the light supplied from the illumination optical apparatus comes to form an optical image in accordance with a video signal; and a projection means for projecting an optical image on the spatial optical modulator onto a screen.

13. A projection display apparatus comprising:

an illumination optical apparatus for forming illumination light according to claim 10;

a spatial optical modulator into which the light supplied from the illumination optical apparatus comes to form an optical image in accordance with a video signal; and a projection means for projecting an optical image on the spatial optical modulator onto a screen.

* * * * *